(12) United States Patent
Hasegawa et al.

(10) Patent No.: US 9,307,115 B2
(45) Date of Patent: Apr. 5, 2016

(54) IMAGE PROCESSING DEVICE GENERATING RECTANGULAR IMAGE DATA FROM INTERMEDIATE IMAGE DATA

(71) Applicant: BROTHER KOGYO KABUSHIKI KAISHA, Nagoya, Aichi (JP)

(72) Inventors: Tomohiko Hasegawa, Okazaki (JP); Takuya Shimahashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/725,123

(22) Filed: May 29, 2015

(65) Prior Publication Data

US 2015/0350489 A1 Dec. 3, 2015

(30) Foreign Application Priority Data

May 30, 2014 (JP) ................................. 2014-112957

(51) Int. Cl.
| | |
|---|---|
| H04N 1/46 | (2006.01) |
| H04N 1/40 | (2006.01) |
| H04N 1/387 | (2006.01) |
| H04N 1/393 | (2006.01) |

(52) U.S. Cl.
CPC ............. *H04N 1/3876* (2013.01); *H04N 1/393* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,633,728 A * | 5/1997 | Tachihara | .................. | G06T 9/00 358/3.01 |
| 5,778,092 A * | 7/1998 | MacLeod | .................. | H04N 1/41 358/426.04 |
| 6,215,914 B1 * | 4/2001 | Nakamura | ........... | H04N 1/3876 348/584 |
| 6,507,415 B1 | 1/2003 | Toyoda et al. | | |
| 7,099,502 B2 * | 8/2006 | Shams | ...................... | G06K 9/00 382/129 |
| 7,697,776 B2 * | 4/2010 | Wu | ....................... | G06K 9/3283 358/3.27 |
| 2003/0038982 A1 * | 2/2003 | Yamaguchi | ............... | G06T 3/40 358/426.12 |
| 2003/0095135 A1 * | 5/2003 | Kaasila | .................. | G06F 3/0481 345/613 |
| 2003/0179409 A1 * | 9/2003 | Nishida | ................... | H04N 1/387 358/2.1 |
| 2004/0183817 A1 * | 9/2004 | Kaasila | ............. | G06F 17/30905 345/660 |
| 2007/0122043 A1 * | 5/2007 | Hasegawa | ............. | G06T 3/4007 382/232 |
| 2007/0139681 A1 * | 6/2007 | Eschbach | ............... | G06K 15/02 358/1.11 |
| 2007/0165035 A1 * | 7/2007 | Duluk | ....................... | G06T 1/60 345/506 |
| 2007/0296749 A1 * | 12/2007 | Mizutani | ................ | G06K 15/02 347/14 |
| 2008/0056587 A1 * | 3/2008 | Hasegawa | ............ | H04N 1/6097 382/232 |
| 2008/0240598 A1 * | 10/2008 | Hasegawa | ................ | G06T 5/40 382/254 |

(Continued)

FOREIGN PATENT DOCUMENTS

| | | |
|---|---|---|
| JP | 9-93430 A | 4/1997 |
| JP | 11-196261 A | 7/1999 |

*Primary Examiner* — Madelein Nguyen
(74) *Attorney, Agent, or Firm* — Scully, Scott, Murphy & Presser, PC

(57) ABSTRACT

An image processing device performs: generating intermediate image data representing an intermediate image in which a first image is combined with a second image; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with a third pixel number and number of pixels aligned in the second direction of the rectangular image is brought into coincidence with a fourth pixel number. A ratio of the third pixel number to the fourth pixel number is equal to a ratio of the first pixel number to the second pixel number.

20 Claims, 14 Drawing Sheets

(56) References Cited

U.S. PATENT DOCUMENTS

| | | | |
|---|---|---|---|
| 2008/0298723 A1* | 12/2008 | Hasegawa | G06T 1/60 382/305 |
| 2009/0003708 A1* | 1/2009 | Steinberg | G06T 7/0081 382/190 |
| 2009/0016647 A1* | 1/2009 | Hamaguchi | G06K 9/00463 382/305 |
| 2009/0122351 A1* | 5/2009 | Tsuchitoi | G03G 21/04 358/3.28 |
| 2009/0161169 A1* | 6/2009 | Muramatsu | H04N 1/40068 358/447 |
| 2010/0111396 A1* | 5/2010 | Boucheron | G06K 9/0014 382/133 |
| 2010/0214584 A1* | 8/2010 | Takahashi | H04N 1/00411 358/1.9 |
| 2012/0219182 A1* | 8/2012 | Hasegawa | H04N 1/3873 382/103 |
| 2013/0242315 A1* | 9/2013 | Shimahashi | G03G 15/043 358/1.1 |
| 2014/0185104 A1* | 7/2014 | Hasegawa | H04N 1/38 358/452 |
| 2014/0293380 A1* | 10/2014 | Hasegawa | H04N 1/56 358/505 |
| 2015/0055193 A1* | 2/2015 | Ozawa | H04N 1/00801 358/474 |
| 2015/0055887 A1* | 2/2015 | Hasegawa | G06T 11/00 382/284 |
| 2015/0254804 A1* | 9/2015 | Hasegawa | G06T 3/0056 345/660 |

* cited by examiner

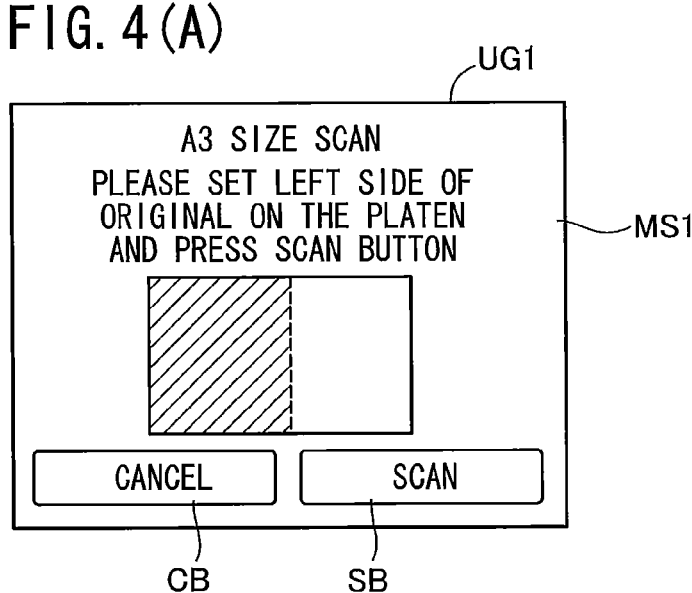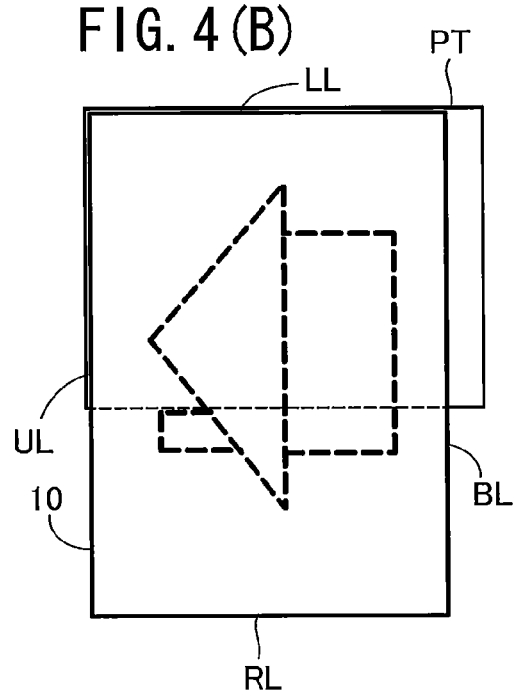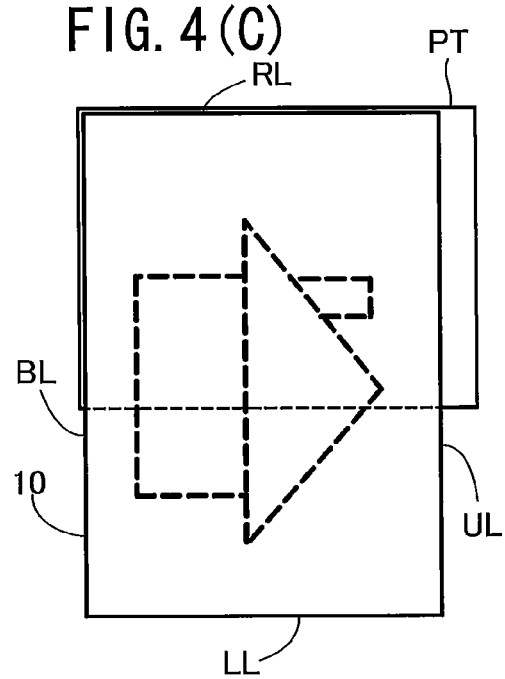

RIGHT-SIDE SCANNED IMAGE

LEFT-SIDE SCANNED IMAGE

FIRST EMBODIMENT

FIG. 10 (A)

STANDARD SIZE TABLE

| SIZE | NUMBER OF VERTICAL PIXELS | NUMBER OF HORIZONTAL PIXELS |
| --- | --- | --- |
| A4 | 827 | 1169 |
| A3 | 1169 | 1654 |
| B4 | 1012 | 1433 |
| B3 | 1433 | 2028 |
| Letter | 850 | 1100 |
| Ledger | 1100 | 1700 |
| Legal | 850 | 1400 |

FIG. 10 (B)

SIZE TABLE (300dpi (VERTICAL) × 300dpi (HORIZONTAL))

| SIZE | NUMBER OF VERTICAL PIXELS | NUMBER OF HORIZONTAL PIXELS |
| --- | --- | --- |
| A4 | 2481 | 3507 |
| A3 | 3507 | 4961 |
| B4 | 3036 | 4299 |
| B3 | 4299 | 6084 |
| Letter | 2550 | 3300 |
| Ledger | 3300 | 5100 |
| Legal | 2550 | 4200 |

FIG. 10 (C)

SIZE TABLE (150dpi (VERTICAL) × 100dpi (HORIZONTAL))

| SIZE | NUMBER OF VERTICAL PIXELS | NUMBER OF HORIZONTAL PIXELS |
| --- | --- | --- |
| A4 | 1240 | 1169 |
| A3 | 1753 | 1654 |
| B4 | 1518 | 1433 |
| B3 | 2149 | 2028 |
| Letter | 1275 | 1100 |
| Ledger | 1650 | 1700 |
| Legal | 1275 | 1400 |

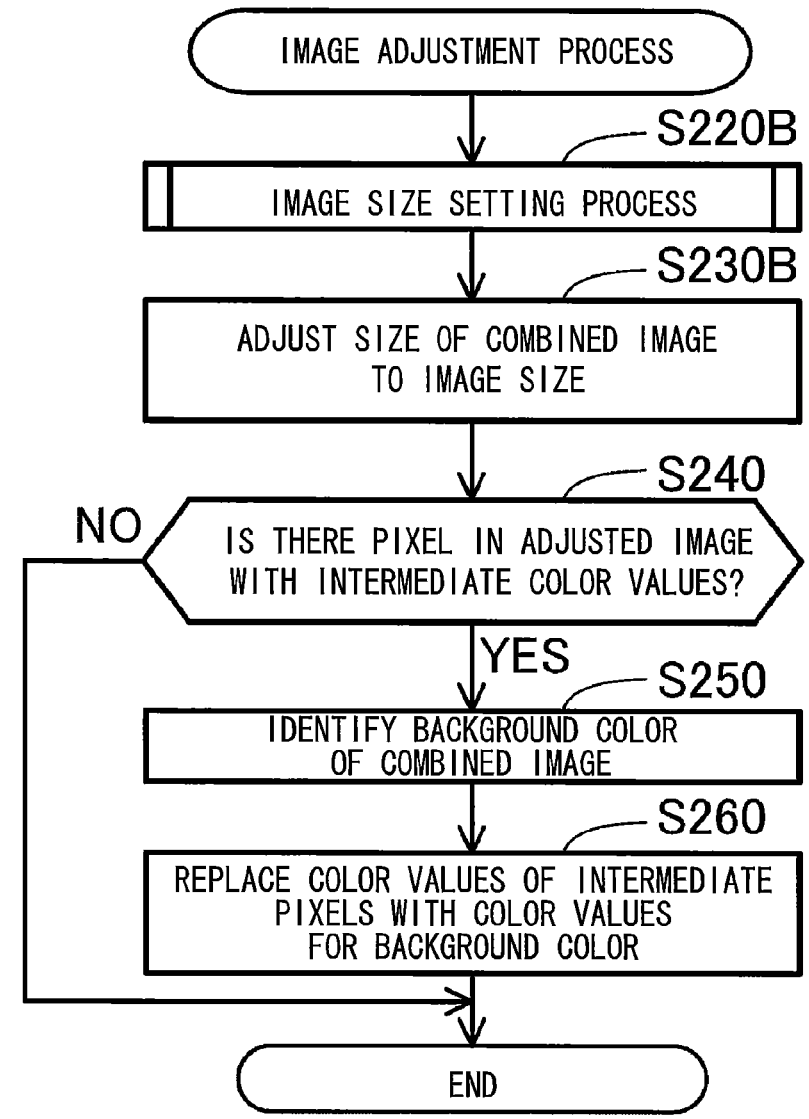

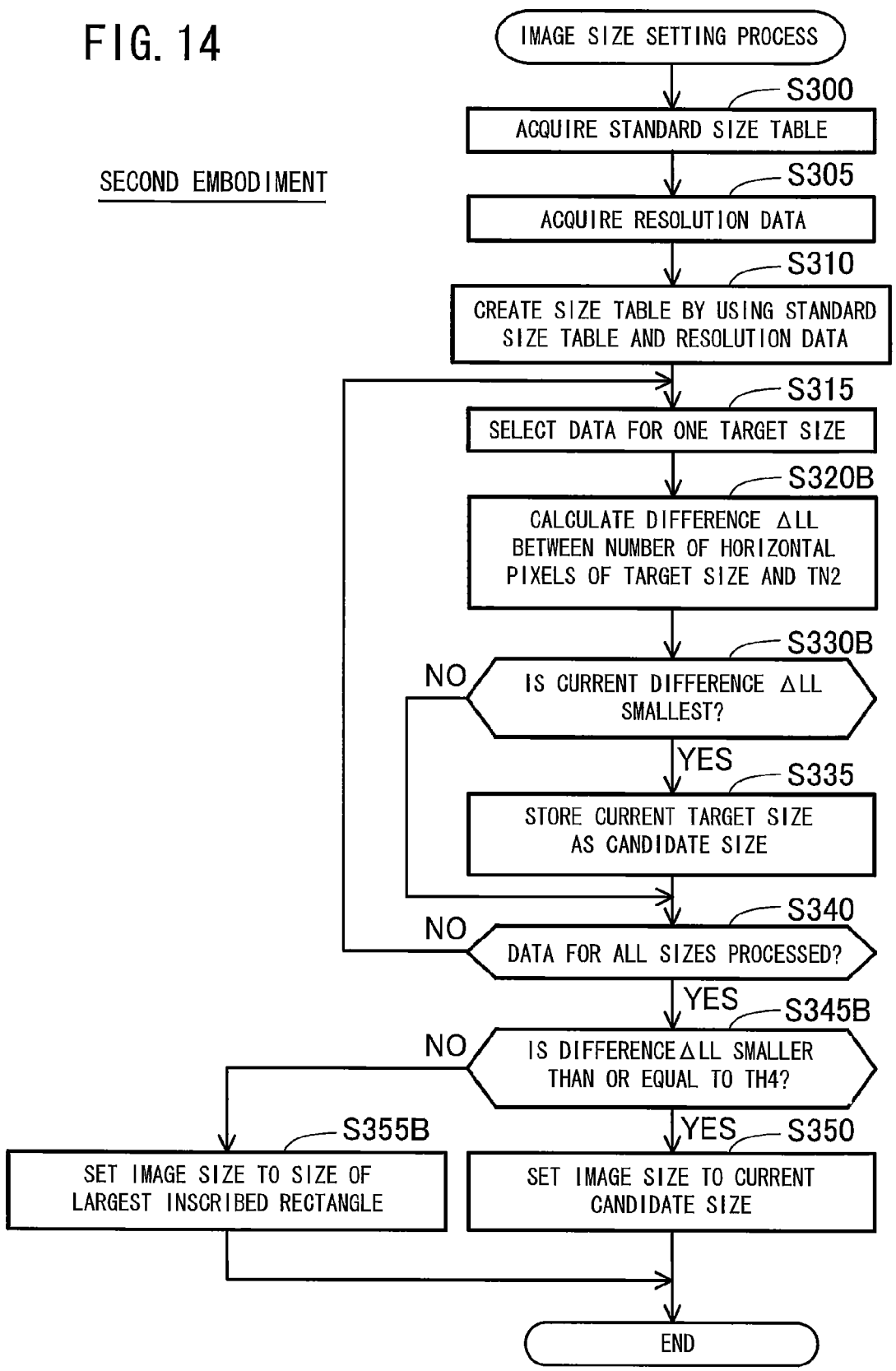

IMAGE PROCESSING DEVICE GENERATING RECTANGULAR IMAGE DATA FROM INTERMEDIATE IMAGE DATA

CROSS REFERENCE TO RELATED APPLICATION

This application claims priority from Japanese Patent Application No. 2014-112957 filed May 30, 2014. The entire content of the priority application is incorporated herein by reference.

TECHNICAL FIELD

The present disclosure relates to a technique for generating image data representing a single image formed by combining a first image and a second image.

BACKGROUND

There are known technologies for generating image data representing a combined image formed by joining a first image with a second image. For example, one image processing device known in the art uses a scanner to perform two passes over an original that is too large to read in one pass, acquiring scan data representing a first image and scan data representing a second image. On the basis of two sets of scan data, the conventional image processing device generates image data representing a combined image formed by combining the first and second images. The combined image represented by this image data is then printed on a standard size sheet of paper (A3 paper, for example).

SUMMARY

However, the image processing device described above could not sufficiently account for the size of the resulting combined image represented by the image data that is generated. Hence, the size of the combined image represented by the image data that the image processing device generates is unknown.

In view of the foregoing, it is an object of the disclosure to provide a novel technique for producing rectangular image data representing an image of a size related to a predetermined size when generating image data for a combined image resulting from joining a first image with a second image.

In order to attain the above and other objects, the disclosure provides an image processing device. The image processing device includes a processor; and a memory storing computer-readable instructions therein. The computer-readable instructions, when executed by the processor, causes the image processing device to perform: acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region; acquiring first image data representing a first image and second image data representing a second image; generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with a third pixel number and number of pixels aligned in the second direction of the rectangular image is brought into coincidence with a fourth pixel number, the third pixel number being obtained by using the first pixel number, the fourth pixel number being obtained by using the second pixel number, a ratio of the third pixel number to the fourth pixel number being equal to a ratio of the first pixel number to the second pixel number.

According to another aspect, the present disclosure provides an image processing device. The image processing device includes a processor; and a memory storing computer-readable instructions therein. The computer-readable instructions, when executed by the processor, causes the image processing device to perform: acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region; acquiring first image data representing a first image and second image data representing a second image; generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image, the intermediate image having a first resolution with respect to the first direction and a second resolution with respect to the second direction; calculating a third pixel number by multiplying a first value by the first pixel number, the first value being determined by the first resolution; calculating a fourth pixel number by multiplying a second value by the second pixel number, the second value being determined by the second resolution; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with the third pixel number and number of pixels aligned in the second direction of the rectangular image is brought into coincidence with the fourth pixel number.

According to another aspect, the present disclosure provides a non-transitory computer readable storage medium storing a set of program instructions installed on and executed by a computer. The program instructions includes: acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region; acquiring first image data representing a first image and second image data representing a second image; generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with a third pixel number and number of pixels aligned in the second direction of the rectangular image is brought into coincidence with a fourth pixel number, the third pixel number being obtained by using the first pixel number, the fourth pixel number being obtained by using the second pixel number, a ratio of the third pixel number to the fourth pixel number being equal to a ratio of the first pixel number to the second pixel number.

BRIEF DESCRIPTION OF THE DRAWINGS

The particular features and advantages of the disclosure as well as other objects will become apparent from the following description taken in connection with the accompanying drawings, in which:

FIGS. 4(A)-4(C) are explanatory diagrams for a process of generating two sets of scan data;

FIG. 10(A) is an example of a standard size table;

FIGS. 10(B) and 10(C) are examples of size tables;

FIG. 13 is a flowchart illustrating an image adjustment process according to a second embodiment; and FIG. 14 is a flowchart illustrating an image size setting process according to the second embodiment.

DETAILED DESCRIPTION

A. First Embodiment

A-1: Structure of an Image Processing System

Figure 1:
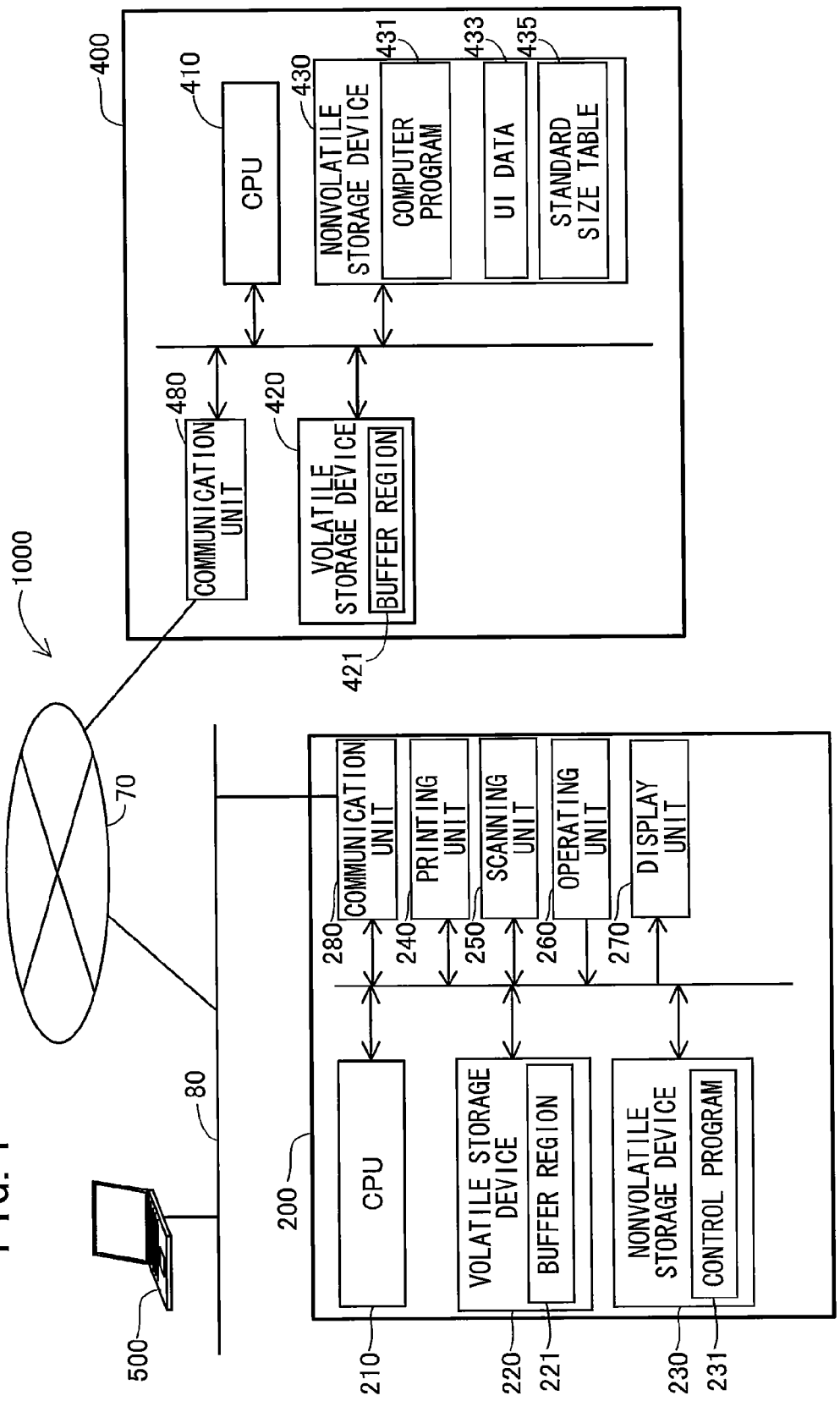
FIG. 1 is a block diagram showing a structure of an image processing system according to a first embodiment.

FIG. 1 is a block diagram showing the structure of an image processing system according to a first embodiment. The image processing system 1000 is configured of a server 400 functioning as an image processing device, and a multifunction peripheral 200. The server 400 is connected to an Internet 70. The multifunction peripheral 200 is also connected to the Internet 70 via a local area network (LAN) 80. Consequently, the server 400 and the multifunction peripheral 200 can communicate with each other via the LAN 80 and the Internet 70.

Further, a personal computer 500 possessed by the user of the multifunction peripheral 200 may be connected to the LAN 80.

The server 400 includes a CPU 410 as an example of the controller for the server 400; a volatile storage device 420, such as DRAM; a nonvolatile storage device 430, such as a hard disk drive or flash memory; and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, user interface (UI) data 433, and a standard size table 435 used in an image size setting process described later.

The computer program 431, the UI data 433, and the standard size table 435 are installed on the server 400 by the administrator of the server 400, for example, by uploading this data to the server 400 through the Internet 70. Alternatively, the computer program 431, the UI data 433, and the standard size table 435 may be supplied on a DVD-ROM or other storage media and installed on the server 400 by the administrator. The CPU 410 executes the computer program 431 to implement an image process described later.

The multifunction peripheral 200 includes a CPU 210 as an example of the controller for the multifunction peripheral 200; a volatile storage device 220, such as DRAM; a nonvolatile storage device 230, such as flash memory or a hard disk drive; a printing unit 240; a scanning unit 250; an operating unit 260, such as a touchscreen, buttons, or the like; a display unit 270, such as a liquid crystal display; and a communication unit 280 for communicating with external devices. The communication unit 280 includes an interface for connecting to the LAN 80 or another network, and an interface for connecting to a USB memory or another external storage device, for example.

The volatile storage device 220 is provided with a buffer region 221 that temporarily stores various data generated when the CPU 210 performs processes. The nonvolatile storage device 230 stores a control program 231.

The printing unit 240 executes printing operations according to an inkjet or laser printing method, for example. The scanning unit 250 produces scan data representing a color or grayscale image by optically reading an original using a photoelectric conversion element such as a CCD (Charge Coupled device) sensor or CMOS (Complementary Metal-Oxide Semiconductor) sensor. The scanning unit 250 is provided with a flatbed type platen PT. The platen PT have a substantially rectangular shape including a longitudinal side and a short side that is shorter than and orthogonal to the longitudinal side. The longitudinal side of the platen PT is slightly longer (a few centimeters, for example) than the longitudinal dimension of an A4 size sheet, which is defined as 297 mm by ISO (abbreviation of International Organization for Standardization) 216 for international standard paper sizes. The short side of the platen PT is slightly greater (a few centimeters, for example) than the shorter side dimension of a "letter" size sheet, which is defined as 215.9 mm by ANSI/ASME (an abbreviation of American National Standards Institute/American Society of Mechanical Engineers) Y14.1. Hence, the maximum size of an original that can be read in one pass by the scanning unit 250 according to the first embodiment is larger than A4 size but smaller than A3 size, where A3 size is also a paper size defined by ISO 216. That is, the scanning unit 250 reads an area whose longitudinal dimension is slightly larger than the longitudinal dimension of an A4-size sheet and whose shorter side dimension is slightly larger than the shorter side dimension of a letter-size sheet, and generates scan data representing the image in this area. As will be described later, the scanning unit 250 can read an A3-size original, for example, in two passes such that both two read images include an overlap region corresponding to the longitudinal center region of the A3-size original.

The CPU 210 controls the multifunction peripheral 200 by executing the control program 231. For example, the CPU 210 can control the printing unit 240 and the scanning unit 250 to execute a copy process, a print process, and a scan process. Further, the CPU 210 can execute a service use process for accessing the server 400 to use services provided thereby.

A-2: Operations of the Image Processing System

Figure 2:
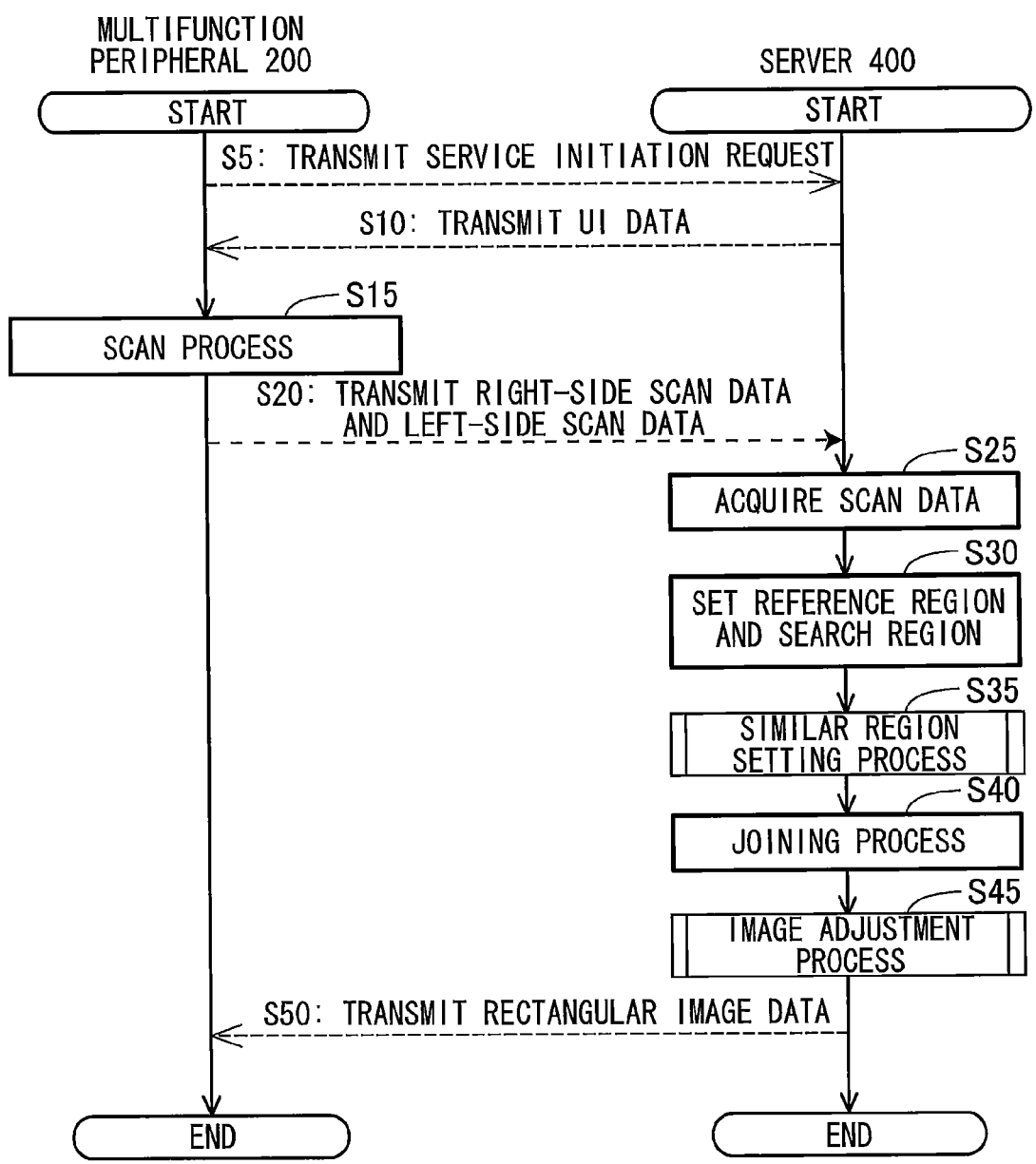
FIG. 2 is a diagram illustrating a sequence of operations performed by the image processing system.

FIG. 2 shows the sequence of operations performed by the image processing system 1000 for an image generation service. The multifunction peripheral 200 initiates the process in FIG. 2 upon receiving a command from the user to use the image generation service provided by the server 400. This service will be described later in greater detail and entails combining a plurality of scanned images represented by scan data obtained through a plurality of passes. As will be described later in greater detail, scan data acquired in a plurality of passes is generated when the scanning unit 250 performs a plurality of passes to read an original that is larger than the maximum size that the scanning unit 250 can read in one pass, for example.

In S5 at the beginning of the process in FIG. 2, the CPU 210 of the multifunction peripheral 200 transmits a service initiation request to the server 400. Upon receiving this request, the CPU 410 of the server 400 selects UI data required for providing the image generation service from the UI data 433 shown in FIG. 1 and in S10 transmits this UI data to the multifunction peripheral 200. The UI data specifically includes screen data representing a user interface screen (hereinafter called a "UI screen"), and control data. The control data includes various data required for the multifunction peripheral 200 to perform a prescribed process, such as the scan process described later in S15, using the UI screen. For example, the control data may include data that the multifunction peripheral 200 needs to perform such processes as transmitting scan data to the server 400 in response to a command received from the user via the UI screen (see FIG. 4, for example). The data that the multifunction peripheral 200 needs may include the destination address for the scan data.

In S15 the CPU 210 executes the scan process in response to the received UI data to generate scan data for a plurality of passes. That is, the CPU 210 performs two passes to read an original that the user has prepared in order to generate two sets of scan data. In the embodiment, scan data is RGB image data that includes RGB color component values represented in 256 gradations (from 0 to 255) for each pixel in the image.

Figure 3:
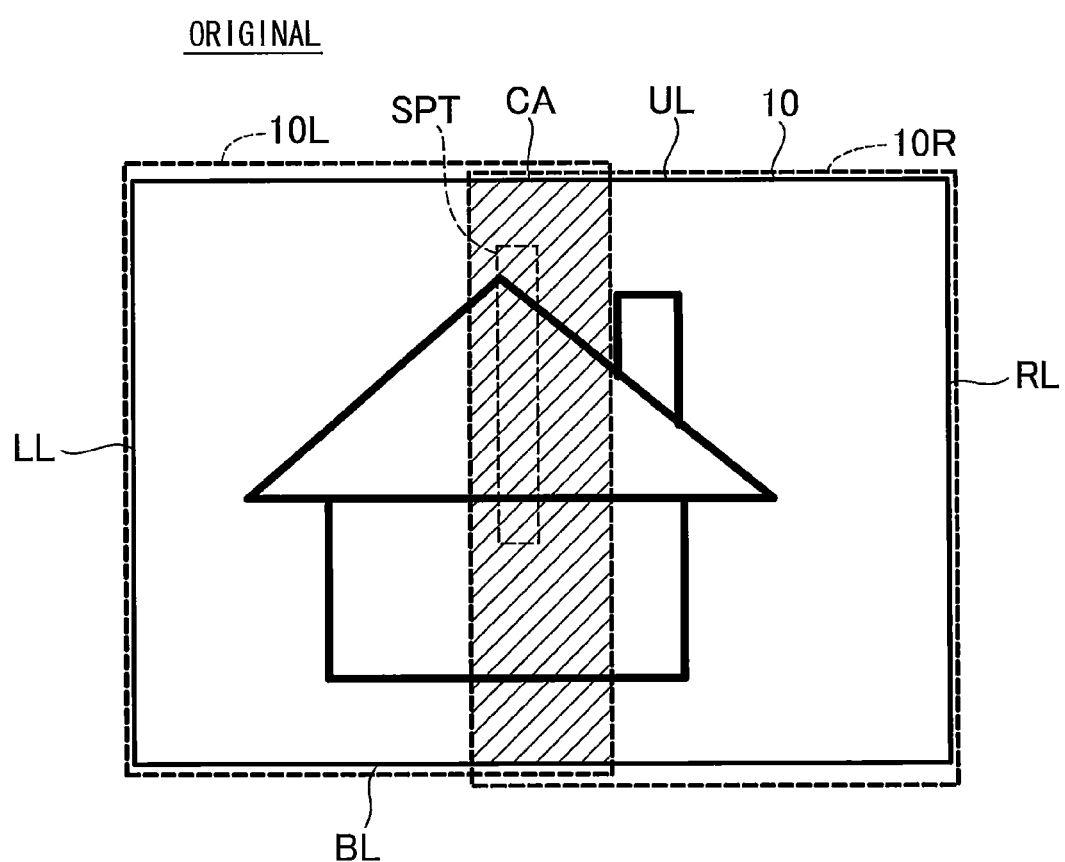
FIG. 3 is an example of an original used in the first embodiment.

FIG. 3 shows a sample original 10 used in the embodiment. The original 10 in FIG. 3 is approximately twice the size of an original that the scanning unit 250 can read in one pass. Since the maximum size that the scanning unit 250 can read in one pass in the embodiment is an area whose longitudinal dimension is slightly greater than the longitudinal dimension of an A4-size sheet and whose short side dimension is slightly greater than the short side dimension of a letter-size sheet, the A3 size is approximately twice this size, for example. When facing the surface of the original 10 in FIG. 3, edges of the original 10 in the following description are defined as a right edge RL, a left edge LL, a top edge UL, and a bottom edge BL. In the embodiment, the longitudinal direction (long side direction) of the original 10 is a horizontal direction and the short side direction of the original 10 is a vertical direction.

FIGS. 4(A)-4(C) are an explanatory diagram for the process of generating two sets of scan data. FIG. 4(A) shows a sample UI screen UG1. Prior to displaying this screen, the CPU 210 displays a prescribed UI screen (not shown) in which the user can input resolution specifications. Resolution includes a resolution in the vertical resolution (hereinafter, referred to as the vertical resolution) and a resolution in the horizontal resolution (hereinafter, referred to as the horizontal resolution). In the embodiment, the vertical resolution is equal to the horizontal resolution, and the user may specify one of the four resolutions 100×100 dpi, 150×150 dpi, 300×300 dpi, and 600×600 dpi. The user may also specify different values for the vertical and horizontal resolutions in the embodiment, such as 100 dpi for the vertical resolution and 150 dpi for the horizontal resolution, or 300 dpi for the vertical resolution and 600 dpi for the horizontal resolution.

Next, the CPU 210 displays the UI screen UG1 in FIG. 4(A) on the display unit 270. In this example, the UI screen UG1 includes a message MS1 prompting the user to set the original 10 suitably on the platen PT, a scan button SB, and a cancel button CB. As indicated in the UI screen UG1, the user sets the original 10 on the platen PT as shown in FIG. 4(B) so that the scanning unit 250 can read a left region 10L (see FIG. 3) constituting approximately the left half of the original 10, and presses the scan button SB. In most cases, the original 10 is placed on the platen PT such that the left edge LL of the original 10 is aligned with the top edge of the platen PT and the top edge UL of the original 10 is aligned with the left edge of the platen PT. Once the user presses the scan button SB, the CPU 210 controls the scanning unit 250 to read the original 10 and generate left-side scan data.

Figure 5:
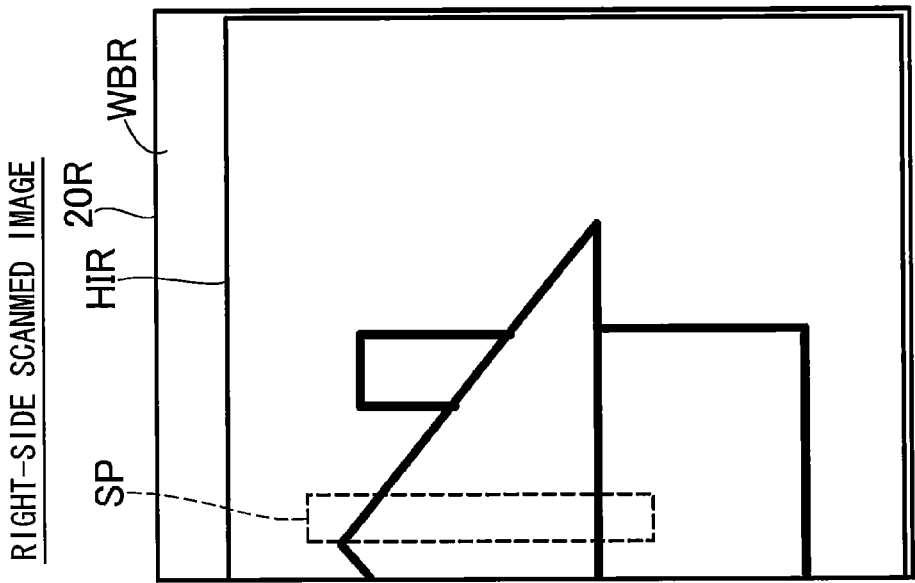
FIGS. 5(A) and 5(B) are an example of a left-side scanned image and an example of a right-side scanned image respectively.
Figure 5:
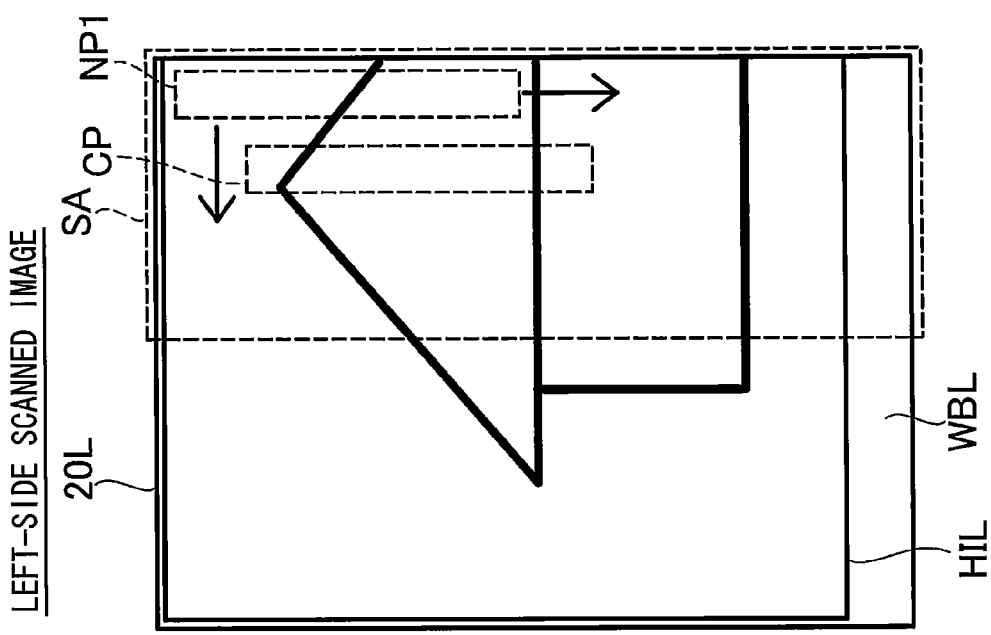

FIG. 5(A) shows a left-side scanned image 20L represented by the left-side scan data. Here, the left-side scanned image 20L includes a left-side original image HIL depicting the left region 10L of the original 10 shown in FIG. 3, and a white border WBL. The white border WBL is the region corresponding to the portion of the platen PT not covered by the original and expresses the color of an original-cover (not shown) that is provided in the multifunction peripheral 200 and positioned in the region facing the platen PT. In the embodiment, the color of the white border WBL is white. When the original 10 is arranged on the platen PT as shown in FIG. 4(B), the left-side scanned image 20L shown in FIG. 5(A) has no margin on the right end portion and almost no margin on the top and left end portions, but includes the white border WBL on its bottom end portion. However, if the original 10 is offset from the position shown in FIG. 4(B), the widths of margins appearing on the top, left, and bottom will differ from those in the left-side scanned image 20L of FIG. 5(A) according to this offset.

Next, the CPU 210 displays the prescribed UI screen (not shown) on the display unit 270. As with the UI screen UG1, this UI screen includes a message prompting the user to place the original 10 appropriately on the platen PT, a scan button, and a cancel button. The user places the original 10 on the platen PT according to the UI screen so that a right region 10R constituting the approximate right half of the original 10 shown in FIG. 3 can be read, and subsequently presses the scan button. In most cases, as illustrated in FIG. 4(C), the original 10 is placed on the platen PT such that the right edge RL of the original 10 is aligned with the top edge of the platen PT and the bottom edge BL is aligned with the left edge of the platen PT. In response to the user pressing the scan button, the CPU 210 controls the scanning unit 250 to read the original and to generate right-side scan data.

FIG. 5(B) shows a right-side scanned image 20R represented by the right-side scan data generated by the scanning unit 250. The right-side scanned image 20R includes a right original image HIR corresponding to the right region 10R of the original 10 shown in FIG. 3, and a white border WBR. When the original 10 is placed on the platen PT as shown in FIG. 4(C), the right-side scanned image 20R has no border on its left end portion, almost no border on its bottom and right end portion, but has the white border WBR on its top end portion, as shown in FIG. 5(B). However, if the original 10 is offset from the position shown in FIG. 4(C), the scanning unit 250 may generate an image having different border widths on the top, right, and bottom end portions from the right-side scanned image 20R shown in FIG. 5(B) according to this offset. Note that both the scanned images 20L and 20R shown in FIGS. 5(A) and 5(B) have the same vertical and horizontal resolutions in this example, such as 300×300 dpi.

Here, an image representing the horizontal center portion CA of the original 10 in FIG. 3 is included in both the region along the right edge of the left-side scanned image 20L and the region along the left edge of the right-side scanned image 20R. In other words, both the left-side scanned image 20L and the right-side scanned image 20R include an image representing the horizontal center portion CA of the original 10. Here, the user may be instructed through the UI screen, the user's manual for the multifunction peripheral 200 and the like to place the original 10 on the platen PT such that the horizontal center portion CA can be read when generating both the left-side and right-side scan data. Note that while the image representing the horizontal center portion CA in the left-side scanned image 20L and the image representing the horizontal center portion CA in the right-side scanned image 20R are similar, they are not a perfect match because some differences will arise due to the position of the original 10 placed by the user on the platen PT and characteristics of the photoelectric conversion elements of the scanning unit 250.

Returning to FIG. 2, in S20 the CPU 210 transmits the right-side scan data representing the right-side scanned image 20R and the left-side scan data representing the left-side scanned image 20L to the server 400. In the embodiment, the two sets of scan data transmitted to the server 400 are two JPEG (Joint Photographic Experts Group) files. The two sets of scan data may be PDF (Portable Document Format) files. Each of these JPEG files includes resolution data indicating both the vertical and horizontal resolutions of the scan data. Upon receiving this scan data, in S25 the CPU 410 of the server 400 acquires and stores the right-side scan data and the left-side scan data in the buffer region 421.

In S30 the CPU 410 sets a reference region SP as a partial region of the right-side scanned image 20R shown in FIG. 5(B), and a search region SA as a partial region of the left-side scanned image 20L shown in FIG. 5(A). The reference region SP is set as a rectangular region having a prescribed size that is arranged at a prescribed position within the right-side scanned image 20R. Further, the reference region SP is arranged in the right-side scanned image 20R within the image representing the horizontal center portion CA of the original 10 in FIG. 3. Specifically, the reference region SP is arranged near the vertical center region of the right-side scanned image 20R at a position separated from the left edge by a prescribed margin (a margin of 10-20 pixels, for example). The horizontal dimension of the reference region SP is 5-20 pixels, for example, while the vertical dimension of the reference region SP is between one-fourth and one-half the number of pixels in the vertical dimension of the right-side scanned image 20R.

The search region SA is a predetermined area. The vertical dimension of the search region SA is equivalent to the entire vertical dimension of the left-side scanned image 20L, as in the example of FIG. 5(A). The left-right dimension (horizontal dimension) of the search region SA is 20-50% the left-right dimension (horizontal) of the left-side scanned image 20L, for example. The search region SA includes the right edge of the left-side scanned image 20L, the right portion of the top edge of the left-side scanned image 20L, and the right portion of the bottom edge of the left-side scanned image 20L.

In S35 (FIG. 2) the CPU 410 executes a similar region setting process. In the similar region setting process, the CPU 410 identifies a similar region CP within the search region SA of the left-side scanned image 20L that is similar to the reference region SP in the right-side scanned image 20R. FIG. 5(A) indicates the similar region CP in the left-side scanned image 20L identified in the similar region setting process. A similar region CP that is similar to the reference region SP is defined as follows. Namely, the similar region CP is a region in the left-side scanned image 20L that represents a specific part SPT of the original 10, as shown in the example of FIG. 3, wherein the specific part SPT of the original 10 is the portion represented in the reference region SP of the right-side scanned image 20R shown in FIG. 5(B).

In S40 the CPU 410 executes a joining process. In the joining process, the CPU 410 uses the left-side and right-side scan data to generate combined image data representing a combined image 30 in which the right original image HIR in the right-side scanned image 20R is joined with a left original image HIL in the left-side scanned image 20L. Combined images 30A, 30B, and 30C in the following description are each an example of the combined image 30.

Figure 6A:
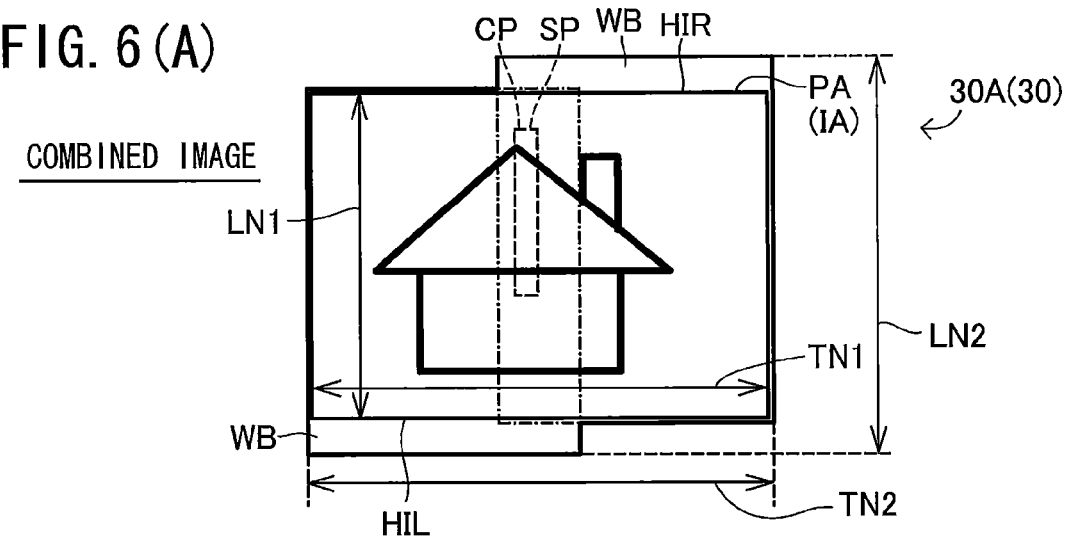
FIGS. 6(A)-6(C) are diagrams illustrating examples of combined images.

FIG. 6(A) shows a combined image 30A in which the two scanned images 20L and 20R shown in FIGS. 5(A) and 5(B) (i.e., two scanned images having the same vertical and horizontal resolutions) have been joined together. As shown in FIG. 6(A), the right original image HIR and the left original image HIL have been joined in the combined image 30A such that the reference region SP in the right original image HIR is superimposed over the similar region CP in the left original image HIL. Here, component values for pixels in the right original image HIR (i.e., the right-side scanned image 20R), for example, are given priority when setting component values in the combined image 30A for pixels in the overlapping region of the right original image HIR and the left original image HIL. Joining the right original image HIR and the left original image HIL in this way produces the combined image 30A representing the original 10 in FIG. 3. As shown in FIG. 6(A), the combined image 30A includes an original region PA representing the image of the original 10, i.e., an image combining the right original image HIR and the left original image HIL, and white borders WB outside the original region PA. The original region PA is rectangular and may also be called a rectangular region PA.

Figure 6B:
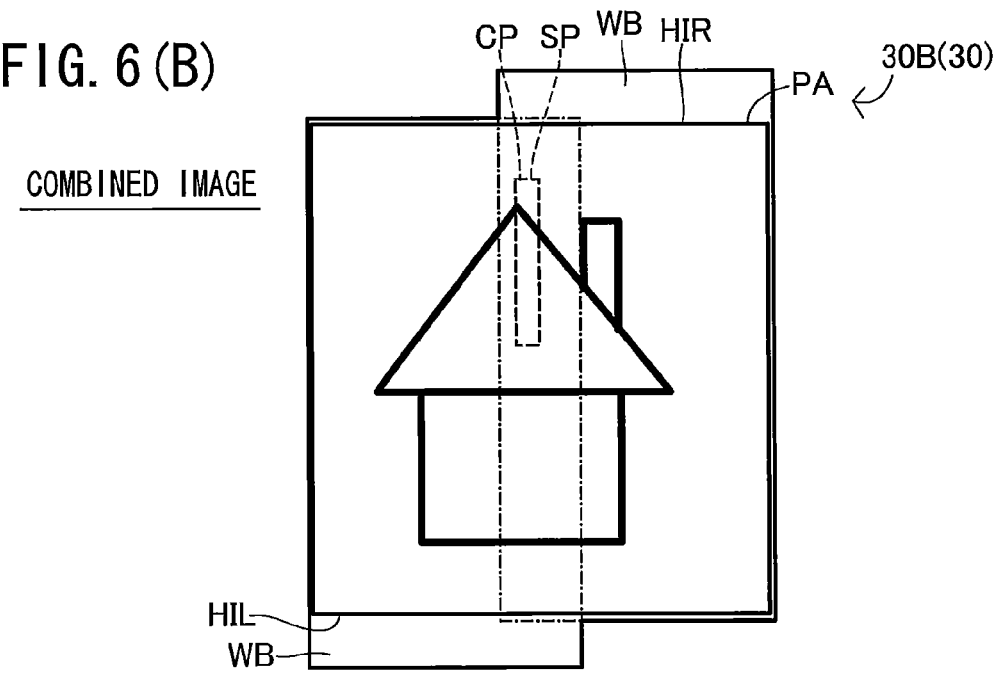

FIG. 6(B) shows an example in which the combined image 30B is formed using two sets of scan data acquired by reading the original 10 in FIG. 3 at a vertical resolution 1.5 times the horizontal resolution. Consequently, the combined image 30B in FIG. 6(B) is distorted from the combined image 30A in FIG. 6(A), since the ratio of pixels in the vertical dimension to pixels in the horizontal dimension is 1.5 times that in the combined image 30A.

Figure 6C:
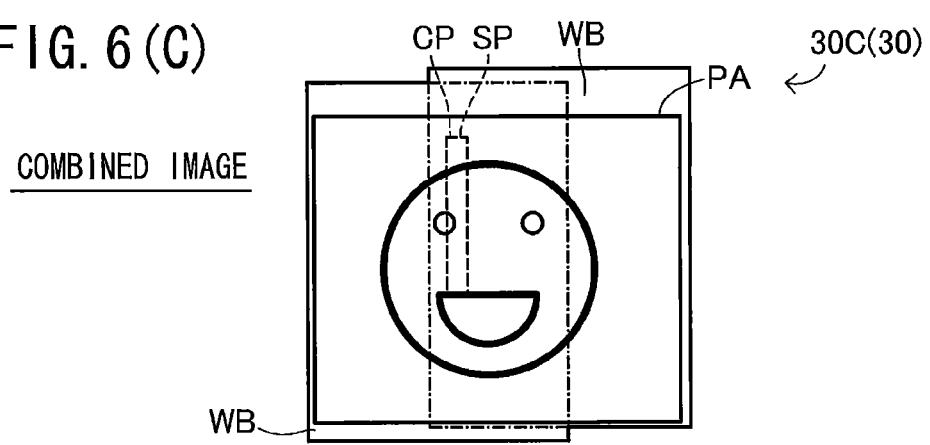

FIG. 6(C) shows an example using two sets of scan data acquired when reading a different original than the original 10 of FIG. 3. In this example, the original has a shorter horizontal dimension than the original 10 in FIG. 3. Hence, the overlapping portions of the two scanned images in the combined image 30C shown in FIG. 6(C) has a greater horizontal dimension than that of the overlapped region in the combined image 30A of FIG. 6(A) and the horizontal dimension of the combined image 30C is shorter that of the combined image 30A. Further, unlike the combined image 30A in FIG. 6(A), the top white border WB is larger than the bottom white border WB in the combined image 30C of FIG. 6(C) due to the positioning of the original on the platen PT. Thus, the combined image produced by joining two scanned images can have various sizes and shapes due to the different sizes of originals being used and the various positions of the originals placed on the platen PT.

Since the vertical positions (top edges and bottom edges, for example) of two scanned images being joined do not generally match, the combined images 30A, 30B, and 30C produced from joining these scanned images are not rectangular, as shown in FIGS. 6(A) through 6(C). Normally, a step is formed in the top edge of the combined image so that one of either the left portion or right portion is higher than the other. The same is true for the bottom edge of the combined image. In the combined images 30A, 30B, and 30C of FIGS. 6(A), 6(B), and 6(C), the top and bottom edges are positioned higher in the right portions than in the left portions. However, since images represented by image data are generally treated as rectangular, a combined image that is actually not rectangular is handled as an image the size of the minimum bounding rectangle (circumscribed rectangle) of the combined image. Thus, regions outside the combined image but within the minimum bounding rectangle are filled with pixels having default pixel values, such as pixel values (R, G, B)=(0, 0, 0).

The combined image 30 is produced by overlapping a partial region in the right-side scanned image 20R with a partial region in the left-side scanned image 20L. More specifically, the left-side scanned image 20L and the right-side scanned image 20R are joined to form the combined image 30 so that their regions representing the horizontal center portion CA of the original 10 (FIG. 3) overlap. Put another way, the combined image 30 can be considered an image formed by combining the right-side scanned image 20R and the left-side scanned image 20L such that the region along the left edge of the right-side scanned image 20R overlaps the region along the right edge of the left-side scanned image 20L. In other words, the combined image 30 is formed by joining the left-side scanned image 20L and the right-side scanned image 20R such that at least a partial region of the left-side scanned image 20L prior to joining (a right portion of the left-side scanned image) is positioned so as to neighbor at least a partial region of the right-side scanned image 20R prior to joining (a left portion of the right-side scanned image). More specifically, the region of the left-side scanned image 20L representing the portion of the original 10 on the left side of the horizontal center portion CA and the region of the right-side scanned image 20R representing the portion of the original 10 on the right side of the horizontal center portion CA are arranged one on either side of the region of the original 10 representing the horizontal center portion CA. The number of pixels constituting the combined image 30 is greater than the number of pixels constituting the left-side scanned image 20L prior to joining and greater than the number of pixels constituting the right-side scanned image 20R prior to joining.

Note that when a similar region CP resembling the reference region SP cannot be identified in the similar region setting process described later, the server 400 generates combined image data representing a combined image in which the two scanned images are joined together mechanically with the right edge of the left-side scanned image 20L abutting the left edge of the right-side scanned image 20R, for example (not shown).

After completing the joining process in S40 of FIG. 2, in S45 the CPU 410 executes an image adjustment process to adjust the combined image 30 represented by the combined image data produced in S40. Through the image adjustment process, the server 400 generates rectangular image data representing an adjusted rectangular image 50. The details of the image adjustment process will be described later, but the rectangular image 50 represented by the rectangular image data produced through the image adjustment process has a size appropriate for printing on a standard size sheet of paper, such as an A3-size or A4-size sheet. Since the rectangular image data produced in the image adjustment process is the image data that will ultimately be outputted, the combined image 30 represented by the combined image data prior to the image adjustment process is called an intermediate image.

In S50 of FIG. 2, the CPU 410 transmits the rectangular image data produced in S45 to the multifunction peripheral 200 serving as the printing unit. The rectangular image data is associated with resolution data indicating the vertical and horizontal resolutions of the rectangular image 50. The rectangular image data may be stored in a PDF file, for example, before being transmitted to the multifunction peripheral 200. The resolution data may be stored in the PDF file as metadata. Upon receiving the rectangular image data, the CPU 210 of the multifunction peripheral 200 stores this data in the nonvolatile storage device 230 and notifies the user that the data has been received. The combined image data is made available to the user. For example, the multifunction peripheral 200 may print the rectangular image 50 on paper of a standard size using the rectangular image data in response to a user command.

The image processing system 1000 having the configuration described above can generate rectangular image data representing a single original 10 using a plurality of sets of image data acquired by reading separate regions of a single original 10, such as that shown in FIG. 3, i.e., using left-side and right-side scan data sets.

A-3. Similar Region Setting Process

Figure 7:
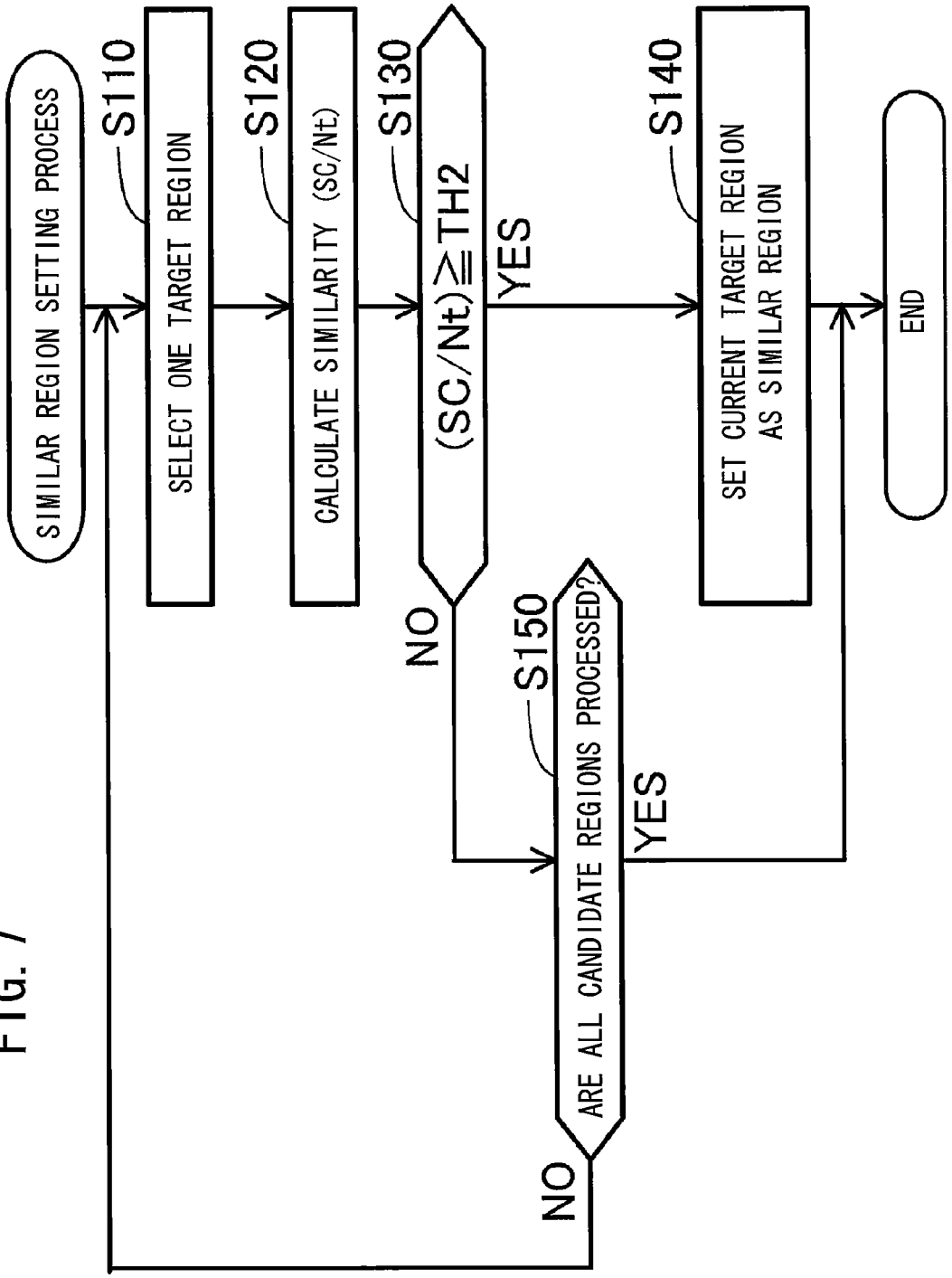
FIG. 7 is a flowchart illustrating a similar region setting process according to the first embodiment.

Next, the similar region setting process in S35 of FIG. 2 will be described with reference to the flowchart in FIG. 7. In S110 the CPU 410 selects one target region from among a plurality of candidate regions in the search region SA shown in FIG. 5(A) that was set within the left-side scanned image 20L in S30 of FIG. 2.

FIG. 5(A) shows one target region NP1 within the search region SA. The size and shape of a single target region is equal to the size and shape of the reference region SP shown in FIG. 5(B) that was set in the right-side scanned image 20R in S30 of FIG. 2. Thus, a plurality of candidate regions NP can be arranged within the search region SA by moving the target region NP1 in FIG. 5(A) one pixel at a time in the vertical or horizontal directions. In S110 the CPU 410 selects each of the total possible candidate regions NP in the search region SA in a prescribed order to be used as the target region.

After selecting the target region, in S120 the CPU 410 calculates a similarity (SC/Nt) for the target region, where the similarity (SC/Nt) is an index value denoting the degree in which the target region is similar to the reference region SP.

The method of calculating the similarity (SC/Nt) is as follows. First, the CPU 410 selects one of the pixels in the target region as the target pixel and determines whether the target pixel is a similar pixel or a dissimilar pixel. Specifically, the CPU 410 calculates a difference ΔVP between the component values of the target pixel and the component values of the pixel in the reference region SP that corresponds to the target pixel. The pixel in the reference region SP that corresponds to the target pixel is the pixel aligned with the target pixel when the target region is superimposed over the reference region SP. The component values for the two pixels used for calculating the difference ΔVP are respectively represented by (R1, G1, B1) and (R2, G2, B2). The difference ΔVP is expressed as the sum of absolute values for the differences between the three component values of the two pixels. In other words, the difference ΔVP is the sum of the absolute value of (R1-R2), the absolute value of (G1-G2), and the absolute value of (B1-B2).

The CPU 410 determines that the target pixel is a similar pixel when the difference ΔVP calculated as described above is smaller than or equal to a prescribed threshold TH1, and determines that the target pixel is a dissimilar pixel when the difference ΔVP is greater than the threshold TH1. In other words, the CPU 410 can determine that a target pixel in the target region is a pixel that is similar to the corresponding pixel in the reference region SP when the difference ΔVP is smaller than or equal to the prescribed threshold TH1.

The CPU 410 then calculates the similarity (SC/Nt) of the target region by dividing the number SC of similar pixels in the target region by the total number Nt of pixels in the target region. In other words, the similarity (SC/Nt) is the ratio of the number SC of similar pixels to the total number Nt of pixels in the target region. Thus, the greater the similarity (SC/Nt) is, the more similar to the reference region SP the target region is.

In S130 the CPU 410 determines whether the similarity (SC/Nt) is greater than or equal to a threshold TH2. Specifically, the CPU 410 determines whether the current target region is similar to the reference region SP.

If the CPU 410 determines that the similarity (SC/Nt) is greater than or equal to the threshold TH2, that is, that the current target region is similar to the reference region SP (S130: YES), in S140 the CPU 410 sets the current target region as the similar region CP, i.e., the region similar to the reference region SP, and ends the similar region setting process.

However, if the similarity (SC/Nt) is less than the threshold TH2 (S130: NO), in S150 the CPU 410 determines whether all candidate regions NP in the search region SA have been selected and processed as the target region. If there remain unprocessed candidate regions NP (S150: NO), the CPU 410 returns to S110 and selects an unprocessed candidate region NP as the target region. If all candidate regions NP have been processed (S150: YES), the CPU 410 ends the similar region setting process without setting a similar region CP that corresponds to the reference region SP. FIG. 5(A) shows a similar region CP that has been set within the left-side scanned image 20L.

A-4. Image Adjustment Process

Next, the image adjustment process in S45 of FIG. 2 will be described with reference to the flowchart in FIG. 8. In the following description, the combined image 30A in FIG. 6(A) will serve as the primary example of the combined image being processed. However, descriptions will also be given for cases in which the combined images 30B and 30C in FIGS. 6(B) and 6(C), respectively are the image being processed, as needed. In S200 of FIG. 8, the CPU 410 generates binary image data representing a binary image by performing thresholding on the combined image 30A. More specifically, the CPU 410 performs a binarization process to determine whether each of the plurality of pixels in the combined image 30A is a white pixel having color values within a specific range for specifying white, or a non-white pixel having color values in a specific range indicating colors other than white. The specific range indicating white is defined by R≥250, G≥250, and B≥250, for example, when the RGB component values are expressed as one of 256 gradations in the range 0-255. The specific range indicating colors other than white is defined by R<250 or G<250 or B<250. The pixels constituting the white borders WB of the combined image 30A are all set as white pixels. Pixels within the original region PA of the combined image 30A can be set as either white pixels or non-white pixels, while pixels constituting the edge of the original region PA are set to non-white pixels.

In S210 the CPU 410 identifies the original region PA in the combined image 30A of FIG. 6 on the basis of the binary image data generated in S200. Specifically, the CPU 410 set, as the original region PA, a smallest rectangular region that includes all non-white pixels. By setting the original region PA to a rectangular region that includes the plurality of pixels having values within the specific range indicating non-white pixels, the CPU 410 can suitably identify the original region PA in the combined image 30A.

Figure 11:
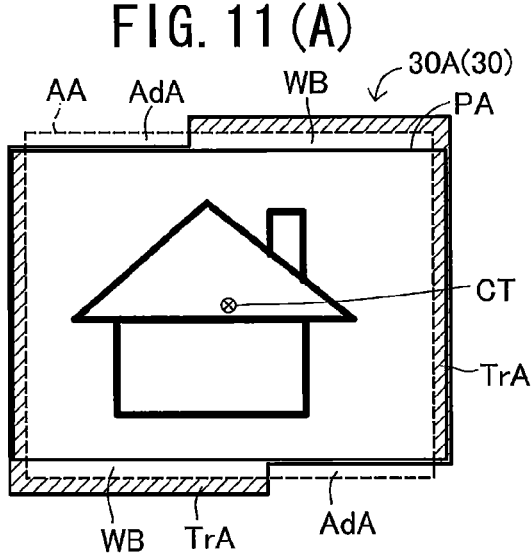
FIGS. 11(A)-11(D) are explanatory diagrams illustrating an adjustment of the combined image.
Figure 11:
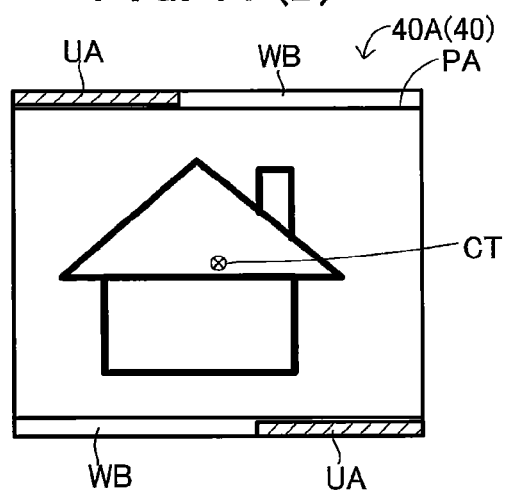
Figure 11:
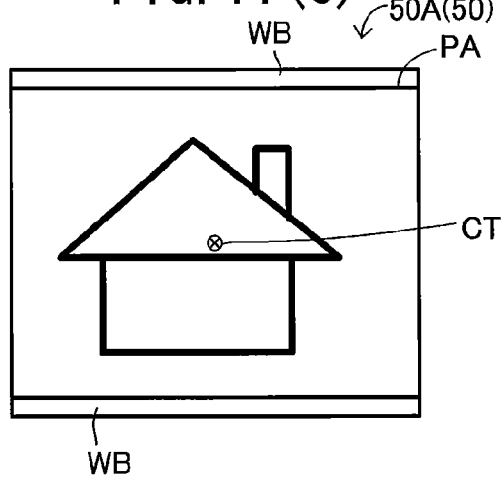
Figure 11:
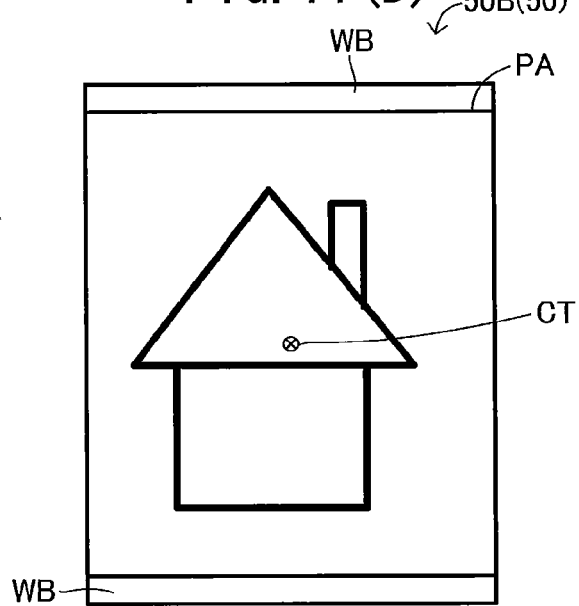
Figure 12:
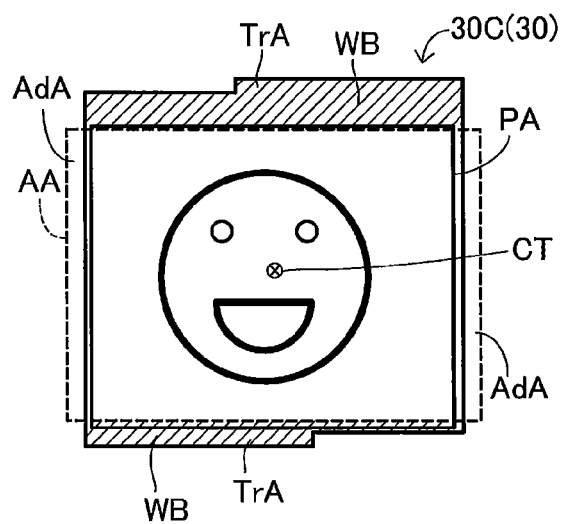
FIGS. 12(A)-12(C) are explanatory diagrams illustrating an adjustment of the combined image.
Figure 12:
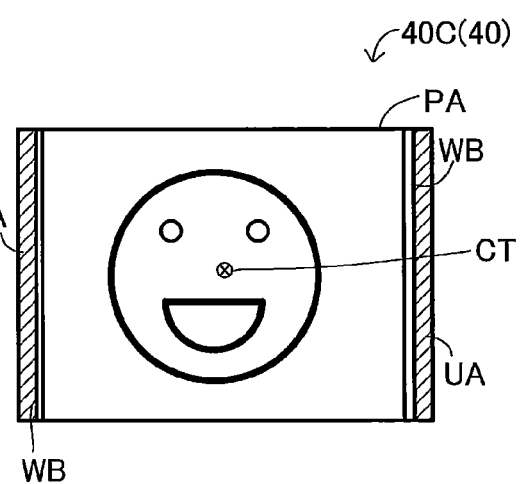
Figure 12:
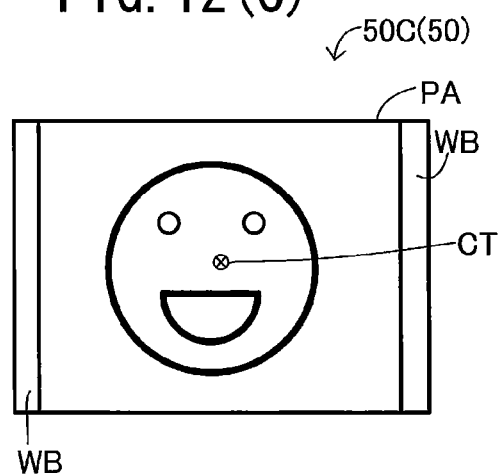

In S220 the CPU 410 executes an image size setting process. Through this image size setting process, the CPU 410 sets the size of a rectangular image 50 (see FIG. 11) represented by rectangular image data that will ultimately be generated, i.e., the number of pixels of the rectangular image 50 in the vertical direction and the number of pixels of the rectangular image 50 in the horizontal direction. Here, the vertical direction is one example of a first direction, while the horizontal direction is one example of a second direction orthogonal to the first direction.

Figure 9:
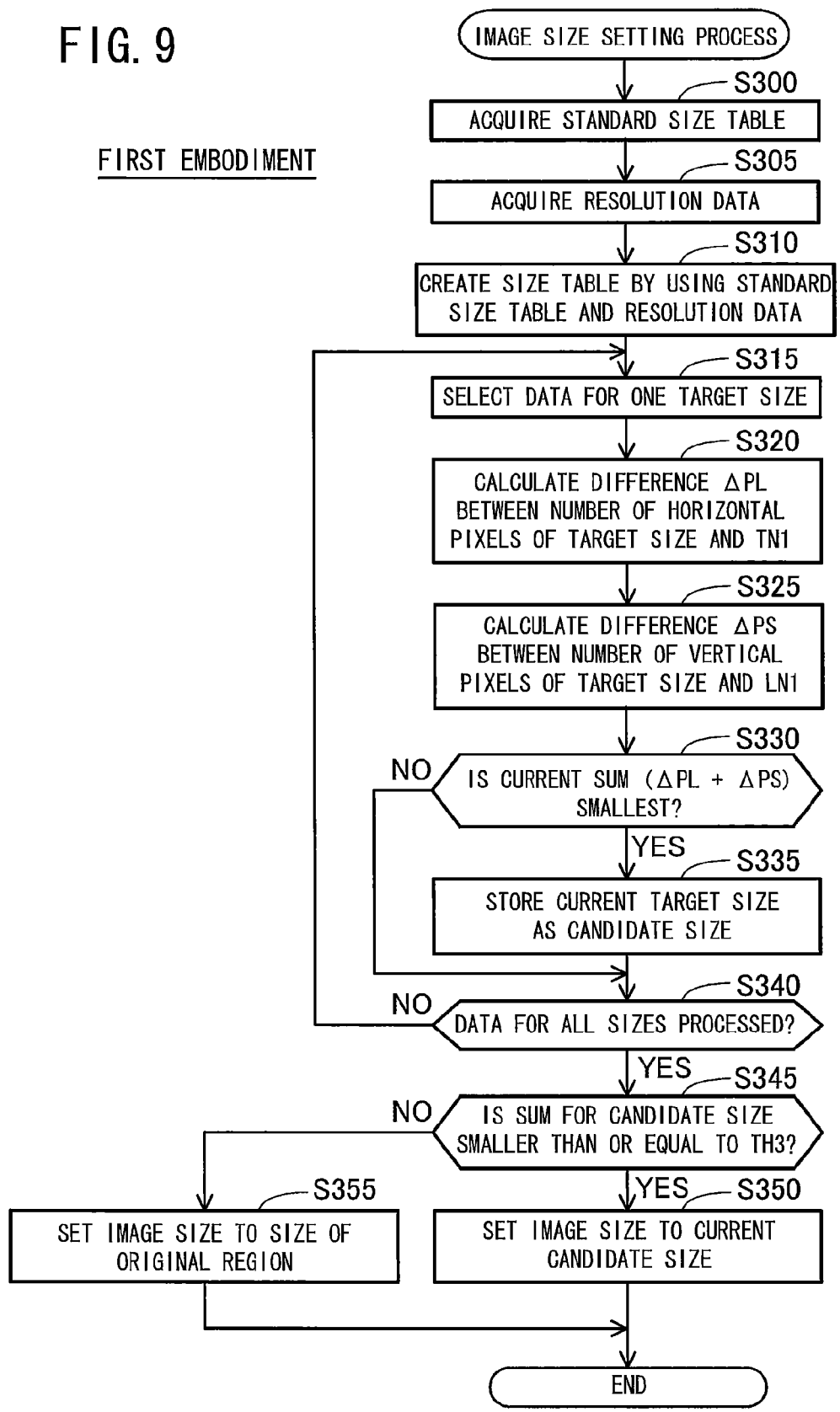
FIG. 9 is a flowchart illustrating an image size setting process according to the first embodiment.

FIG. 9 is a flowchart illustrating steps in the image size setting process. In S300 the CPU 410 acquires the standard size table 435 from the nonvolatile storage device 430 in FIG. 1 and stores the standard size table 435 in the buffer region 421. FIGS. 10(A), 10(B), 10(C) show an example of a size table for a reference resolution, a size table for a 300×300 dpi resolution, and a size table for a 150×100 dpi resolution, respectively. That is, a standard size table 435 in FIG. 10(A) includes data for a plurality of standard sizes that denote specific rectangular sizes. More specifically, the standard size table 435 includes data for seven rectangular sizes of the types A4, A3, B4, B3, letter, ledger, and legal. The paper sizes A4, A3, B4, and B3 are defined by ISO 216, while the paper sizes letter, ledger, and legal are defined by ANSI/ASME Y14.1.

The data for each standard size includes the number of pixels in the vertical direction and the number of pixels in the horizontal direction of the rectangular shape. In the data for each standard size, the vertical and horizontal dimensions of the rectangular shape are specified in pixel numbers for the case where vertical and horizontal resolutions are set to 100×100 dpi. The 100×100 dpi resolution will be called the reference resolution.

In S305 the CPU 410 acquires resolution data specifying the resolution of the combined image 30A being processed. More specifically, the CPU 410 accesses the metadata in the PDF file that includes the two sets of scan data used to generate the combined image 30A and extracts the resolution data from the metadata as resolution data for the combined image 30A. By referencing this resolution data, the CPU 410 can determine the vertical resolution and the horizontal resolution of the combined image 30A.

In S310 the CPU 410 creates a size table using the standard size table 435 and the acquired resolution of the combined image 30A. This size table includes size data determined on the basis of the resolutions of the combined image 30A, i.e., the pixel number in the vertical direction and the pixel number in the horizontal direction for each of the seven square shapes described above. The pixel number for the vertical direction is calculated by multiplying a prescribed value corresponding to the resolution of the combined image 30A in the vertical direction by the number of pixels in the vertical direction listed in the corresponding reference size data. The prescribed value corresponding to the resolution of the combined image 30A in the vertical direction is obtained by dividing the resolution of the combined image 30A in the vertical direction by the reference resolution in the vertical direction.

Similarly, the number of pixels in the size data for the horizontal direction is calculated by multiplying a prescribed value corresponding to the resolution of the combined image 30A in the horizontal direction by the number of pixels in the reference size data of the corresponding size for the horizontal direction. The prescribed value corresponding to the resolution of the combined image 30A in the horizontal direction is obtained by dividing the resolution of the combined image 30A in the horizontal direction by the reference resolution in the horizontal direction.

Thus, if the resolution of the combined image 30A shown in FIG. 6(A) is 300×300 dpi, then both the prescribed value corresponding to the vertical resolution of the combined image 30A and the prescribed value corresponding to the horizontal resolution of the combined image 30A are 300 dpi/100 dpi=3. Hence, the same prescribed value is used for the vertical resolution and horizontal resolution when the vertical and horizontal resolutions of the combined image are the same. FIG. 10(B) shows the size table created when the combined image 30A of FIG. 6(A) is the process target. The ratio of the number of pixels in the vertical direction to the number of pixels in the horizontal direction given in the size data stored in the size table of FIG. 10(B) is equal to the ratio of the number of pixels in the vertical direction to the number of pixels in the horizontal direction for the corresponding reference size.

If the resolution of the combined image 30B in FIG. 6(B) is 150 (vertical resolution)×100 (horizontal resolution) dpi, the prescribed value corresponding to the vertical resolution of the combined image 30B is 150 dpi/100 dpi=1.5, while the prescribed value corresponding to the horizontal resolution of the combined image 30B is 100 dpi/100 dpi=1. When the vertical resolution of the combined image differs from its horizontal resolution, the prescribed value corresponding to the vertical resolution is different from the prescribed value corresponding to the horizontal resolution. FIG. 10(C) shows the size table created when the combined image 30B of FIG. 6(B) is the process target. Here, the ratio of the number of pixels in the vertical direction to the number of pixels in the horizontal direction given in the size data stored in the size table in FIG. 10(C) is not equal to the ratio of the number of pixels in the vertical direction to the number of pixels in the horizontal direction for the corresponding reference size.

In S315 the CPU 410 selects data for one target size from the data in the created size table for the seven sizes. Here, the size of the rectangular shape represented by the target size data will be called the target size. Thus, the process S315 is for selecting one target size.

In S320 the CPU 410 calculates a difference ΔPL between the number of pixels of the target size in the horizontal direction and number of pixels TN1 of the original region PA in the combined image 30A in the horizontal direction (hereinafter called the "horizontal pixel number TN1"). The CPU 410 acquires the number of pixels of the target size in the horizontal direction by referencing the size table created in S310. For example, when the size table in FIG. 10(B) is being used and the target size is the A3 size, the number of pixels in the horizontal direction of the target size is 4,961.

In S325 the CPU 410 calculates a difference ΔPS between the number of pixels in the vertical direction of the target size and number of pixels LN1 in the vertical direction of the original region PA in the combined image 30A (hereinafter called the "vertical pixel number LN1"). The CPU 410 acquires the number of pixels in the vertical direction of the target size by referencing the size table created in S310. For example, when the size table of FIG. 10(B) is being used and the target size is the A3 size, the number of pixels in the vertical direction of the target size is 3,507.

In S330 the CPU 410 determines whether the sum of differences in the two directions calculated for the target size, i.e., the sum of the differences (ΔPL+ΔPS) is the smallest among the one or more sums of differences that have been calculated to this point. That is, the sum of the differences (ΔPL+ΔPS) for the current target size is determined to be the smallest value when the current sum of the differences (ΔPL+ΔPS) is smaller than the sum of the differences for a candidate size that has already been stored in the buffer region 421. Here, the sum of differences for a candidate size already stored in the buffer region 421 is the smallest of the sum of differences for one or more rectangular sizes that were selected as the target size prior to the current target size. If a sum of differences for a candidate size has not already been stored in buffer region 421, i.e., when the current target size is the first target size, the sum of differences (ΔPL+ΔPS) for the current target size is determined unconditionally to be the smallest value.

If the CPU 410 determines that the sum of differences for the current target size is the smallest value (S330: YES), in S335 the CPU 410 stores the current target size in the buffer region 421 as a candidate size. The CPU 410 also stores the sum of differences for the current target size in the buffer region 421 as the sum of differences for the candidate size.

However, if the CPU 410 determines that the sum of differences for the current target size is not the smallest value (S330: NO), the CPU 410 skips S335 and advances to S340.

In S340 the CPU 410 determines whether data for all sizes listed in the size table has been selected as the target size data. When unprocessed size data remains (S340: NO), the CPU 410 returns to S315 and selects unprocessed size data as the target size data. When all size data has been processed (S340: YES), the CPU 410 advances to S345. At this point, the candidate size stored in the buffer region 421 is closest to the size of the original region PA in the combined image 30A from among the seven rectangular sizes specified by the size data recorded in the size table.

In S345 the CPU 410 determines whether the sum of differences for the candidate size is smaller than or equal to a threshold TH3. In other words, the CPU 410 determines whether the candidate size is relatively close to the size of the original region PA in the combined image 30A.

If the sum of differences for the candidate size is smaller than or equal to the threshold TH3 (S345: YES), i.e., when the candidate size is relatively close to the size of the original region PA, in S350 the CPU 410 sets the image size for the rectangular image 50 to be generated to the current candidate size.

However, if the sum of differences for the candidate size is greater than the threshold TH3 (S345: NO), i.e., when the candidate size is not relatively close to the size of the original region PA, in S355 the CPU 410 sets the image size of the rectangular image 50 to be generated to the size of the original region PA in the combined image 30A. Once the image size has been set, the CPU 410 ends the image size setting process.

In the image size setting process described above, an absolute value of ΔPL and an absolute value of ΔPS may be used instead of the differences ΔPL and ΔPS. That is, in S330 the CPU 410 may determine whether a sum (|ΔPL|+|ΔPS|), is the smallest among the one or more sums of absolute values that have been calculated to this point. In this case, when the current sum is smallest value, in S335 the CPU 410 stores the current sum of the absolute values of differences as the sum of the absolute values for the candidate size. Further, in S345 the CPU 410 determines whether the sum for the candidate size is smaller than or equal to the threshold TH3.

According to this image size setting process, when one of the standard sizes A3, A4, and the like recorded in the size table as size data is relatively close to the size of the original region PA, the CPU 410 sets the image size of the rectangular image 50 to be produced to the standard size relatively close to the size of the original region PA. In this case, the size of the original depicted in the original region PA, i.e., the size of the original 10 in FIG. 3 read in S15 of FIG. 2, is assumed to be a standard size that is relatively close to the size of the original region PA. For this reason, it is thought preferable to set the size of the rectangular image 50 to this standard size.

On the other hand, if none of the A3, A4, or other standard sizes recorded in the size table are relatively closely to the size of the original region PA, the CPU 410 sets the image size of the rectangular image 50 to be produced to the size of the original region PA. In this case, it is assumed that the size of the original 10 in FIG. 3 read in S15 of FIG. 2 is a nonstandard size. For this reason, it is thought preferable to use the size of the original region PA itself, rather than a standard size, as the image size of the rectangular image 50.

Figure 8:
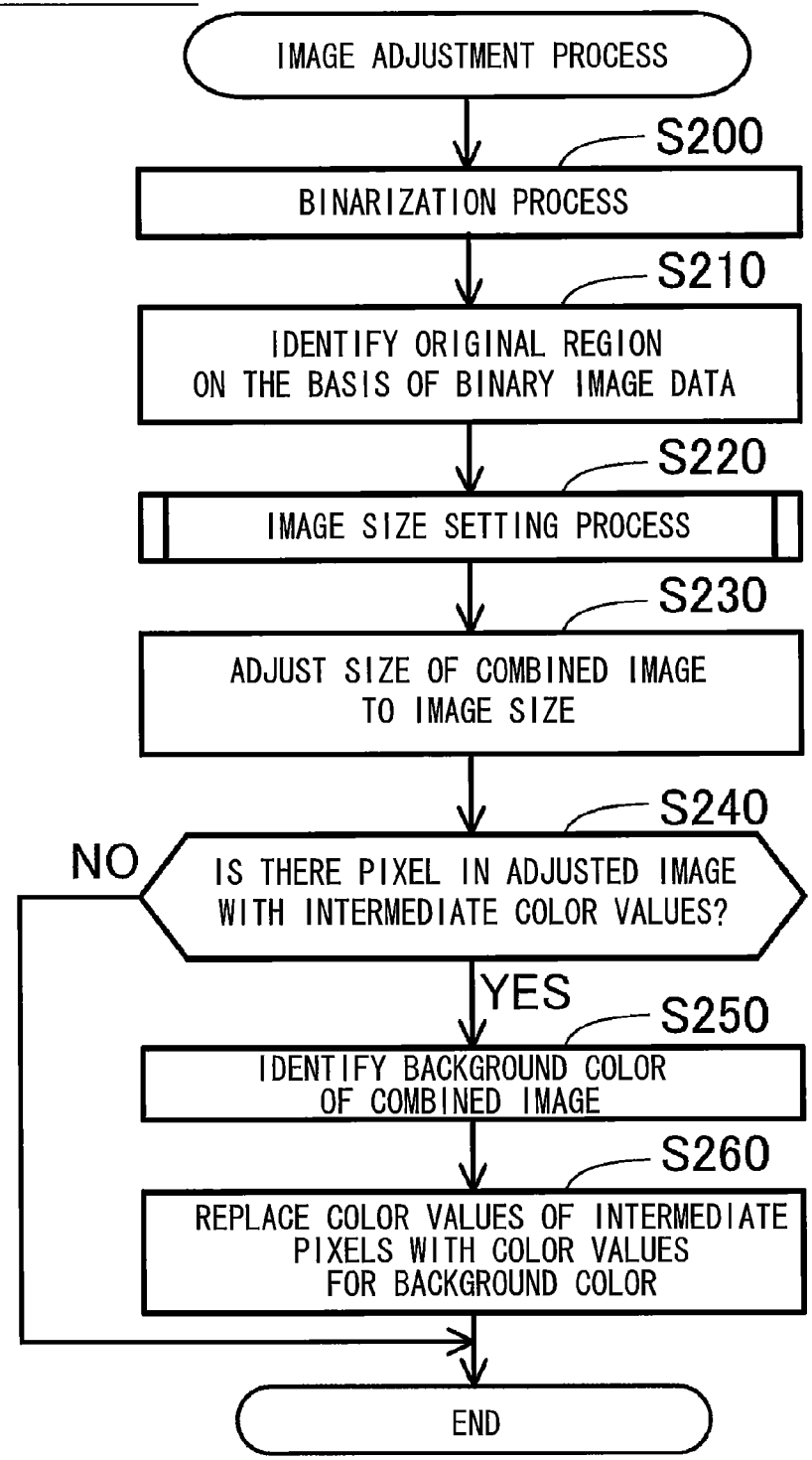
FIG. 8 is a flowchart illustrating an image adjustment process according to the first embodiment.

After completing the image size setting process, in S230 of FIG. 8 the CPU 410 adjusts the size of the combined image 30A to the image size set in S220. FIGS. 11(A)-12(C) illustrate how the size of the combined image is adjusted.

More specifically, when a center CT of the original region PA in the combined image 30A overlaps the center of a border AA having a size equivalent to the image size set in S222 and when there exist regions TrA within the combined image 30A but outside the border AA, as shown in FIG. 11(A), the plurality of pixels within the regions TrA are deleted. Here, the center CT is horizontal and vertical center of the original region PA, and the center of the boarder AA is equivalent of horizontal and vertical center of the image size set in S222. Further, when the center CT of the original region PA overlaps the center of the border AA and when there exist regions AdA outside the combined image 30A but inside the border AA, the regions AdA is filled with a plurality of pixels having indeterminate color values. The color values for pixels with indeterminate color values may be set to temporary values, such as (R, G, B)=(0, 0, 0). When the image size set in S220 is a standard size, such as A3 or A4 (S350 of FIG. 9), the size of the original region PA in the combined image 30A is relatively close to the size of the border AA but not the same size. On the other hand, if the image size is set to the size of the original region PA (S355 of FIG. 9), the size of the original region PA in the combined image 30A is the same as the size of the border AA.

In the examples of FIGS. 11(A) and 12(A), the plurality of pixels within the regions TrA depicted with shading has been deleted, and a plurality of pixels has been added to the regions AdA. For the combined image 30A in the example of FIG. 11(A), pixels have been deleted from regions TrA along part of the top edge, part of the bottom edge, the entire left edge, and the entire right edge, and pixels have been added to regions AdA along part of the top edge and part of the bottom edge. This results in an adjusted combined image, and specifically the square adjusted image 40A shown in FIG. 11(B). For the combined image 30C shown in the example of FIG. 12(A), pixels have been deleted from regions TrA along the top and bottom edges of the combined image 30C, while pixels have been added to the regions AdA along the left and right edges of the combined image 30C. This results in a rectangular adjusted image 40C shown in FIG. 12(B). Note that the adjusted images 40A and 40C are each an example of an adjusted image 40.

In S240 the CPU 410 determines whether there exist any pixels in the adjusted image 40 with indeterminate color values. In other words, the CPU 410 determines whether any pixels were added when generating the adjusted image 40 in S230. In the examples of FIGS. 11(B) and 12(B), the respective adjusted images 40A and 40C include regions UA having a plurality of newly added pixels. Accordingly, the CPU 410 determines that the adjusted image 40 has pixels with indeterminate color values.

When the adjusted image 40 has pixels of indeterminate color values (S240: YES), in S250 the CPU 410 identifies the background color of the combined image 30. For example, when the CPU 410 generates the adjusted image 40, and specifically the plurality of pixels depicting the background of the combined image 30, the CPU 410 sets the background color using the plurality of pixels that is along the outer edge of the regions UA in which the new pixels have been added, that is contiguous with the regions UA, and whose color values have been determined. Since the regions UA with the newly added pixels are all contiguous with margins in the examples of FIGS. 11(B) and 12(B), the CPU 410 calculates the color values of the background color by taking the averages of the RGB color values in the plurality of pixels in the margins Thus, the background colors of the combined images 30 in the examples of FIGS. 11(B) and 12(B) have color values depicting the color of the white borders WB.

In S260 the CPU 410 replaces the color values of the indeterminate pixels, i.e., the color values of the pixels in the regions UA of FIGS. 11(B) and 12(B) with color values for the background color calculated in S250. This produces a rectangular image 50 in which unnatural parts remaining along the edges of the adjusted image 40 are adjusted to a natural state. In other words, the rectangular image 50 that is generated last will be less likely to include unnatural parts in its edges. After completing S260, the CPU 410 ends the image adjustment process. When this image adjustment process is performed on the combined images 30A, 30B, and 30C in the examples of FIGS. 6(A), 6(B), and 6(C), the CPU 410 generates rectangular image data representing the rectangular images 50A, 50B, and 50C depicted in FIGS. 11(C), 11(D), and 12(C), respectively. The rectangular images 50A, 50B, and 50C are all examples of the rectangular image 50. Since the rectangular image 50B depicted in FIG. 11(D) has a vertical resolution that is 1.5 times its horizontal resolution, the aspect ratio of the rectangular image 50B has a longer vertical dimension than the aspect ratio of the original 10 in FIG. 3. Thus, the device that displays or prints the rectangular image 50B on the basis of this rectangular image data, and specifically the multifunction peripheral 200 or a computer on which a PDF viewer has been installed, must account for the resolutions given in the resolution data when displaying or printing the rectangular image 50B. This will enable the rectangular image 50B to be printed or displayed at the same aspect ratio as the original 10 shown in FIG. 3.

Note that when the CPU 410 determines in S240 of FIG. 8 that there are no pixels with indeterminate color values in the adjusted image 40 (S240: NO), the CPU 410 skips steps S250 and S260 and ends the image adjustment process. In this case, the rectangular adjusted image 40 is set as the final rectangular image 50.

In the embodiment described above, the CPU 410 executes the image size setting process of FIG. 9 to set the image size of a rectangular image 50 being generated, i.e., the number of pixels in the vertical direction and the number of pixels in the horizontal direction on the basis of standard size data recorded in the standard size table 435. The number of pixels in the vertical direction is acquired on the basis of the number of pixels in the vertical direction of a specific rectangular shape, such as A3 or A4 size, indicated in the standard size data. Similarly, the number of pixels in the horizontal direction is acquired on the basis of the number of pixels in the horizontal direction of the specific rectangular shape indicated in the standard size data. In S230 of FIG. 8, the CPU 410 executes at least one of a process to delete pixels from the combined image 30 and a process to add pixels not included in the combined image 30 in order to generate rectangular image data representing a rectangular image 50 whose number of pixels in the vertical direction is equivalent to the number of pixels in the vertical direction of the image size set in the image size setting process and whose number of pixels in the horizontal direction is equivalent to the number of pixels in the horizontal direction of the image size set in the image size setting process. By appropriately deleting pixels from and adding pixels to the combined image 30 using the standard size data, the CPU 410 can generate rectangular image data representing a rectangular image 50 at an appropriate size.

More specifically, as described in S230 of the image adjustment process in FIG. 8, when generating an adjusted image 40, the CPU 410 deletes, from the combined image 30, a plurality of pixels along edges of the combined image 30 with respect to the horizontal direction (that is, edges parallel to the vertical direction) if the number of pixels in the horizontal direction in the combined image 30 is larger than the number of pixels in the horizontal direction of the image size set in S220. The CPU 410 also deletes, from the combined image 30, a plurality of pixels along edges of the combined image 30 with respect to the vertical direction (that is, edges parallel to the horizontal direction) if the number of pixels in the vertical direction in the combined image 30 is larger than the number of pixels in the vertical direction in the image size set in S220. Further, when generating the adjusted image 40, the CPU 410 adds a plurality of pixels to edges of the combined image 30 on horizontal ends (that is, edges parallel to the vertical direction) if the number of pixels in the horizontal direction of the combined image 30 is smaller than the number of pixels in the horizontal direction of the image size set in S220. The CPU 410 also adds a plurality of pixels to edges of the combined image 30 on the vertical ends (that is, edges parallel to the horizontal direction) if the number of pixels in the vertical direction of the combined image 30 is smaller than the number of pixels in the vertical direction of the image size set in S220. Thus, by deleting pixels from and/or adding pixels to the combined image 30, which is an intermediate image, the CPU 410 can generate the adjusted image 40 of a size related to a standard size on the basis of the number of pixels in the combined image 30 and the number of pixels in the determined image size, i.e., the rectangular image 50 to be generated. In this way, the CPU 410 can ultimately generate a rectangular image 50 of a size related to a standard size.

In S230 of FIG. 8, the CPU 410 performs the deletion and addition of pixels on the horizontal edges of the combined image on the basis of the horizontal center of the original region PA in the combined image 30, i.e., the horizontal position of the center CT of the original region PA. Similarly, the CPU 410 performs the deletion and addition of pixels on the vertical edges on the basis of the vertical center of the original region PA, i.e., the vertical position of the center CT of the original region PA. In this way, the CPU 410 can appropriately delete pixels from the combined image 30 and add pixels to the intermediate image. Hence, the CPU 410 can suitably generate an adjusted image 40 that represents the original 10 in FIG. 3 by not allowing the center of the adjusted image 40 to deviate from the center of the original region PA. Thus, the CPU 410 can ultimately generate a rectangular image 50 that appropriately represents the original 10 in FIG. 3.

As described with reference to S305 and S310 in FIGS. 9 and 10(A)-10(C), the number of pixels in the vertical direction of the image size in the image size setting process of FIG. 9 is calculated by multiplying the number of pixels in the vertical direction of a specific rectangular shape such as an A3 or A4 size sheet, indicated in the reference size data, by a prescribed value corresponding to the vertical resolution of the combined image 30. Similarly, the number of pixels in the horizontal direction of the image size is calculated by multiplying the number of pixels in the horizontal direction of the specific rectangular shape such as an A3 or A4 size sheet, indicated in the standard size data, by a prescribed value corresponding to the horizontal resolution of the combined image 30. In this way, the CPU 410 can adjust the combined image 30 using the standard size data and the resolutions of the intermediate image to generate rectangular image data representing the rectangular image 50 of a suitable size for the resolutions of the combined image 30. Here, the prescribed value corresponding to the vertical resolution is the same as the prescribed value corresponding to the horizontal resolution when the vertical resolution of the combined image 30 is equal to the horizontal resolution. When the vertical resolution and the horizontal resolution differ from each other, the prescribed value corresponding to the vertical resolution will differ from the prescribed value corresponding to the horizontal resolution. Thus, the CPU 410 can generate rectangular image data representing a rectangular image 50 of a suitable size for the resolutions of the combined image 30, regardless of whether the vertical resolution and the horizontal resolution of the combined image 30 are the same or different.

In the image size setting process of FIG. 9, the CPU 410 sets the image size to one of a plurality of rectangular sizes specified by the size data recorded in the size table using both the vertical pixel number LN1 and the horizontal pixel number TN1 of the original region PA set in the combined image 30. In other words, both the vertical pixel number LN1 and the horizontal pixel number TN1 of the original region PA are used to set size data for one size. This size data is then used to generate rectangular image data. In this way, the CPU 410 can generate rectangular image data representing a rectangular image 50 of an appropriate size for the size of the original region PA in the combined image 30. Since the plurality of entries for size data in the size table have a one-to-one correspondence to the plurality of entries for reference size data in the standard size table 435, setting size data for a single size on the basis of the size table is equivalent to setting reference size data for a single reference size on the basis of the standard size table 435.

More specifically, in S320, S325, and S330 of FIG. 9, the CPU 410 sets size data for a suitable size using the difference ΔPL and the difference ΔPS. Here, the difference ΔPL is a difference between the vertical pixel number LN1 of the original region PA and the vertical pixel number in the specific rectangular shape specified by the size data, and the difference ΔPS is a difference between the horizontal pixel number TN1 of the original region PA and the horizontal pixel number in the specific rectangular shape specified by the size data. Thus, the differences ΔPL and ΔPS of pixel numbers can be used to set suitable size data indicating a size that is relatively close to the original region PA.

However, when it is not possible to set size data for a suitable size using the differences ΔPL and ΔPS in pixel numbers, in S345 and S355 of FIG. 9 the CPU 410 sets the image size to the size of the original region PA. Hence, the CPU 410 generates rectangular image data representing the image within the original region PA. As a result, the CPU 410 can suitably generate rectangular image data depicting the original region PA, even when unable to set size data to a suitable standard size.

B. Second Embodiment

The second embodiment differs from the first embodiment in the image adjustment process. FIG. 13 is a flowchart illustrating steps in an image adjustment process according to the second embodiment, wherein steps that are identical to those in the first embodiment described with reference to FIG. 8 are designated with the same step numbers and steps differing from those in FIG. 8 have the letter "B" appended to the step number.

In the image adjustment process of FIG. 13, the process for setting the original region PA in the combined image 30, and specifically steps S200 and S210 of FIG. 8, are not executed. In S220B in the image adjustment process of FIG. 13, the CPU 410 executes an image size setting process for setting the size of the rectangular image 50. However, unlike the image size setting process in FIG. 9 of the first embodiment, the CPU 410 does not use the size of the original region PA in the second embodiment.

FIG. 14 is a flowchart illustrating steps in the image size setting process according to the second embodiment, wherein steps that are identical to those in the first embodiment described with reference to FIG. 9 are designated with the same step numbers and steps differing from those in FIG. 9 have the letter "B" appended to the step number. In the image size setting process of FIG. 14, the CPU 410 uses the size of the combined image 30 in place of the size of the original region PA to set the image size of the rectangular image 50.

In S320B the CPU 410 calculates a difference ΔLL between the number of pixels in the horizontal direction of the target size and a horizontal pixel number TN2 of the combined image 30A shown in FIG. 6(A), for example. Here, the CPU 410 acquires the number of pixels in the horizontal direction of the target size by referencing the size table that was created in S310.

In S330B the CPU 410 determines whether the difference ΔLL in the horizontal direction that was calculated for the target size is the smallest value among the one or more differences calculated to this point. Specifically, when the difference ΔLL for the current target size is smaller than the difference for the candidate size already stored in the buffer region 421, the difference ΔLL for the current target size is found to be the smallest value.

If the CPU 410 determines that the difference ΔLL for the current target size is the smallest value (S330B: YES), in S335 the CPU 410 stores the current target size in the buffer region 421 as the candidate size. The CPU 410 also stores the difference ΔLL for the current target size in the buffer region 421 as the difference for the candidate size.

However, if the CPU 410 determines that the difference ΔLL for the current target size is not the smallest value (S330B: NO), the CPU 410 skips S335 and advances to S340.

Once the CPU 410 completes the process in S320B-S335 for all of the size data (S340: YES), in S345B the CPU 410 determines whether the difference ΔLL for the candidate size is smaller than or equal to a threshold TH4.

If the difference ΔLL for the candidate size is smaller than or equal to the threshold TH4 (S345B: YES), in S350 the CPU 410 sets the image size for the rectangular image being generated to the current candidate size.

However, if the difference for the candidate size is greater than the threshold TH4 (S345B: NO), in S355B the CPU 410 sets the image size for the rectangular image being generated to the size of the largest inscribed rectangle IA in the combined image 30. After setting the image size, the CPU 410 ends the image size setting process. In the example of FIG. 6(A), the largest inscribed rectangle IA in the combined image 30A is approximately the same region as the original region PA in the combined image 30A. Hence, when arranging the original 10 on the platen PT in the most common positions described with reference to FIGS. 4(B) and 4(C) to generate two sets of scan data required for producing the combined image 30, the largest inscribed rectangle IA in the combined image 30 will substantially match the original region PA in the combined image 30 as in the example of FIG. 6(A).

In the image size setting process shown in FIG. 14, an absolute value of the difference ΔLL may be used instead of the difference ΔLL. Specifically, in 330B the CPU 410 determines whether the absolute value of the difference ΔLL in the horizontal direction that was calculated for the target size is the smallest absolute value among the one or more absolute values of differences calculated to this point. If the CPU 410 determines that the current absolute value of difference ΔLL is the smallest value (S330B: YES), in S335 the CPU 410 stores the absolute value of difference ΔLL for the current target size in the buffer region 421 as the absolute value of difference for the candidate size. In S345B the CPU 410 determines whether the absolute value of difference ΔLL for the candidate size is smaller than or equal to a threshold TH4. If the positive determination is made in S345B, the process proceeds to S350 whereas the negative determination is made in S345B, the process proceeds to S355B.

Returning to FIG. 13, in S230B, as in S230 of FIG. 8, the CPU 410 adjusts the size of the combined image 30 to the image size set in S220B. However, in S230 of FIG. 8, the CPU 410 deletes and adds pixels in the vertical and horizontal edges of the combined image 30 on the basis of the center CT of the original region PA. In S230B of FIG. 13, the CPU 410 deletes and adds pixels in the vertical and horizontal edges of the combined image 30 on the basis of the center of the combined image 30. In the example of FIG. 6(A), the central position in the range specified by a vertical pixel number LN2 is used as the reference position for the vertical direction, while the central position in the range specified by a horizontal pixel number TN2 is used as the reference position for the horizontal direction. Here, the vertical pixel number LN2 indicates number of pixels between the tope edge of the combined image 30 and the bottom edge of the combined image, that is, the maximum number of pixels arranging in the vertical direction in the combined image 30. The horizontal pixel number TN2 is number of pixels between the left edge of the combined image 30 and the right edge of the combined image 30.

In the example of FIG. 6(A), the center CT of the original region PA (see FIG. 11(A)) approximately matches the center of the combined image 30A (not shown). Hence, when the original 10 is arranged on the platen PT in the most common positions described with reference to FIGS. 4(B) and 4(C) in order to generate two sets of scan data for producing the combined image 30, the center of the combined image 30 is approximately the same as the center of the original region PA in the combined image 30, as in the example of FIG. 6(A). When the center of the combined image 30 matches the center of the original region PA in the combined image 30, the adjusted image 40 generated in S230 of FIG. 8 according to the first embodiment is equal to the adjusted image 40 generated in S230B of FIG. 13 according to the second embodiment.

As described above, the size data is set using only the horizontal pixel number of the combined image 30A. Here, the horizontal pixel number is the pixel number of the longitudinal direction of the combined image 30A. The images 20L and 20R are combined such that a partial region of the image 20L along an edge parallel to the vertical direction thereof is overlapped with a partial region of the image 20R along an edge parallel to the vertical direction thereof. The vertical direction corresponds to the short side direction of the combined image parallel to the longitudinal direction.

In the second embodiment described above, the CPU 410 uses the horizontal pixel number TN2 of the combined image 30 to set the image size to one of the plurality of rectangular sizes specified by the size data recorded in the size table. In other words, the CPU 410 selects size data for one size to be used as the image size on the basis of the number of pixels in the horizontal direction of the combined image 30, and then generates rectangular image data using this size data. As a result, the CPU 410 can generate rectangular image data representing a rectangular image of a suitable size for the size of the combined image 30.

More specifically, since the horizontal pixel number TN2 of the combined image 30A matches the horizontal pixel number TN1 of the original region PA in the combined image 30A most of the time, as in the example of FIG. 6(A), the horizontal pixel number TN2 of the combined image 30A may be used in place of the horizontal pixel number TN1 for the original region PA, eliminating the need to identify the original region PA. That is, when the original 10 is arranged on the platen PT in the most common layouts described with reference to FIGS. 4(B) and 4(C) in order to generate two sets of scan data for producing the combined image 30, the horizontal pixel number TN2 of the combined image 30A is substantially equivalent to the horizontal pixel number TN1 of the original region PA in the combined image 30A, as in the example of FIG. 6(A).

More specifically, in S320B and S330B of FIG. 14 the CPU 410 selects size data for one suitable size using the difference ΔLL between the horizontal pixel number TN1 of the combined image 30 and the horizontal pixel number of a specific rectangular shape specified by the size data. Thus, the CPU 410 can set size data for a suitable size using the difference ΔLL between pixel numbers.

On the other hand, the vertical pixel number LN2 of the combined image 30A is not used for setting the size data in the embodiment, since the vertical pixel number LN2 frequently does not match the vertical pixel number LN1 of the original region PA in the combined image 30A, as in the example of FIG. 6(A).

As described above, the combined image 30 can be formed by joining the right-side scanned image 20R and the left-side scanned image 20L such that a region along the left edge of the right-side scanned image 20R overlaps a region along the right edge of the left-side scanned image 20L. Hence, the horizontal pixel number for the combined image 30 in the embodiment is the number of pixels in a direction orthogonal to the left edge of the joined right-side scanned image 20R or the right edge of the joined left-side scanned image 20L. That is, it is possible to set suitable size data on the basis of the number of pixels in a direction orthogonal to the left edge of the joined right-side scanned image 20R or the right edge of the joined left-side scanned image 20L.

Further, since the horizontal direction of the combined image 30 follows the juxtaposed direction of the two scanned images, the length in the horizontal direction is often the longest dimension of the combined image 30. Thus, the horizontal pixel number TN2 of the combined image 30 can be called the number of pixels in the longest dimension of the combined image 30. Hence, it is possible to set suitable size data using the number of pixels along the longest dimension of the combined image 30.

Further, when it is not possible to set suitable size data using the difference ΔLL with respect to the number of pixels, in S345B and S355B of FIG. 14 the CPU 410 sets the image size to the size of the largest inscribed rectangle in the combined image 30. Since the largest inscribed rectangle IA in the combined image 30 substantially matches the original region PA in the combined image 30 in this case, the CPU 410 generates rectangular image data suitably representing the image inside the original region PA. Thus, the CPU 410 can generate suitable rectangular image data, even when it is not possible to set suitable size data to a standard size.

Further, in S230B of FIG. 13, the CPU 410 deletes and adds pixels along the vertical and horizontal edges of the combined image 30. As described above, when the original 10 is arranged on the platen PT in the most common layouts described with reference to FIGS. 4(B) and 4(C) in order to generate two sets of scan data for producing the combined image 30, the center of the combined image 30 substantially matches the center of the original region PA in the combined image 30. Accordingly, the CPU 410 can prevents the center of the original region PA from deviating from the center of the adjusted image 40, thereby generating an adjusted image 40 that suitably represents the original 10 in FIG. 3 on the basis of the center of the combined image 30.

C. Variations of the Embodiments

While the invention has been described in detail with reference to the embodiments thereof, it would be apparent to those skilled in the art that various changes and modifications may be made therein.

(1) In the image size setting process according to the first embodiment described above, size data is set on the basis of both the vertical pixel number and the horizontal pixel number for the original region PA. However, the CPU 410 may set size data on the basis of only on the vertical pixel number of the original region PA by finding size data having a vertical pixel number that most closely matches the vertical pixel number of the original region PA. Similarly, the CPU 410 may set size data using only the horizontal pixel number of the original region PA.

(2) In the image size setting process according to the second embodiment described above, size data is set using only the horizontal pixel number of the combined image 30A. However, the CPU 410 may set size data using the vertical pixel number of the combined image 30A in addition to the horizontal pixel number. For example, the CPU 410 may compare, as confirmation, the vertical pixel number of the combined image 30A to the vertical pixel number of size data that is set on the basis of the horizontal pixel number of the combined image 30A (in S350 of FIG. 14, for example) and may avoid using the size data that is set on the basis of the horizontal pixel number when the difference between the vertical pixel number of the combined image 30A and the vertical pixel number of the size data is excessive.

(3) In the image size setting process according to the first embodiment described above, size data is set using the number of pixels in the original region PA. However, the size data may be set using the number of pixels in a rectangular object region that includes an object in the original region PA, rather than the number of pixels in the original region PA. For example, after the CPU 410 identifies the original region PA, the CPU 410 may separate regions denoting the background of the original from regions denoting objects in the original using a well-known analytical method for analyzing the image in the original region PA. The CPU 410 may then set the size data on the basis of the vertical and horizontal pixel numbers for the identified object region.

(4) In the embodiments described above, the CPU 410 sets a rectangular image of the determined image size on the basis of the center CT of the original region PA or the center of the combined image 30. However, the CPU 410 may set the rectangular image on the basis of the center of the object in the original region PA instead. In this case, as in Variation (3) described above, the CPU 410 performs a process for identifying the object.

(5) In the embodiments described above, color values for the plurality of pixels in the regions UA that were newly added to produce the adjusted image 40 are replaced with color values depicting the color of the margins in the adjusted image 40 in S250 and S260 of FIG. 8, as illustrated in FIGS. 11(B) and 11(C). However, the color values for the pixels in the regions UA may instead be replaced with color values depicting the background color in the original region PA of the adjusted image 40. In this case, the average values of color values for pixels within at least a partial region of the specified original region PA along the edge of the original region PA are used as color values depicting the background color of the original region PA. In this case, the color values of pixels in regions constituting the margins in the adjusted image 40 may be replaced with color values depicting the background color in the original region PA. For example, the values of all pixels positioned outside the original region PA may be replaced with color values depicting the background color in the original region PA. This method can suppress any unnatural regions from appearing along the edges of the final rectangular image 50.

The color values for the pixels in the regions UA may be replaced with color values depicting the background color in at least one of the scanned images 20L and 20R.

(6) If the two images represented by the two sets of scan data are referred to as the first image and the second image, respectively, the CPU 410 in the embodiments generates a combined image by joining the region along the left edge of the right-side scanned image 20R serving as the first image with the region along the right edge of the left-side scanned image 20L serving as the second image. Alternatively, the combined image may be generated by joining the region along the right edge of the first image with the image along the left edge of the second image according to the single original that was used to generate the two sets of scan data, for example, or by joining the region near the bottom edge of the first image with the region near the top edge of the second image or by joining the region near the top edge of the first image with the region near the bottom edge of the second image.

(7) In the embodiments described above, two sets of scan data are used to generate combined image data representing a combined image formed by joining two scanned images, but combined image data may be generated using any number of sets of scan data. For example, four sets of scan data may be used to generate combined image data representing a combined image that is formed by joining four scanned images.

(8) In the embodiments described above, two sets of scan data generated from an original read by the scanning unit 250 of the multifunction peripheral 200 are the two sets of image data used for producing combined image data. However, a digital camera may generate these two sets of data by capturing images for a plurality of regions of an original.

(9) In the embodiments described above, the two sets of scan data used to generate the combined image data include right-side scan data and left-side scan data obtained by reading a single original 10. However, the two sets of scan data may be acquired by reading two separate originals.

(10) The processes executed by the CPU 410 of the server 400 in the embodiments described above (for examples, processes in S25-S45 of FIG. 2) may be executed by the CPU 210 of the multifunction peripheral 200 instead. In this case, the server 400 is not needed, and the multifunction peripheral 200 may execute the processes in FIG. 2 alone. Further, the processes executed by the CPU 410 of the server 400 may be executed by a CPU (not shown) in the personal computer 500 (see FIG. 1) connected to the multifunction peripheral 200. The CPU of the personal computer 500 may perform these processes by executing a scanner driver program installed on the personal computer 500, for example. Further, the server 400 may be configured of a single computer, as in the embodiments, or may be configured of a computer system including a plurality of computers.

(11) Part of the configuration implemented in hardware in the embodiments described above may be replaced with software and, conversely, part of the configuration implemented in software in the embodiments may be replaced with hardware.

What is claimed is:

1. An image processing device comprising:
a processor; and
a memory storing computer-readable instructions therein, the computer-readable instructions, when executed by the processor, causing the image processing device to perform:
acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region;
acquiring first image data representing a first image and second image data representing a second image;
generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image; and
generating rectangular image data representing a rectangular image by executing at least one of addition of at least one pixel to the intermediate image and deletion of at least one pixel from the intermediate image such that number of pixels aligned in the first direction of the rectangular image is brought into coincidence with a third pixel number and number of pixels aligned in the second direction of the rectangular image is brought into coincidence with a fourth pixel number, the third pixel number being obtained by using the first pixel number, the fourth pixel number being obtained by using the second pixel number, a ratio of the third pixel number to the fourth pixel number being equal to a ratio of the first pixel number to the second pixel number.

2. The image processing device according to claim 1, wherein the intermediate image has a first resolution with respect to the first direction and a second resolution with respect to the second direction,
   wherein the computer-readable instructions, when executed by the processor, causes the image processing device to further perform:
   calculating the third pixel number by multiplying a first value by the first pixel number, the first value being determined by the first resolution,
   calculating the fourth pixel number by multiplying a second value by the second pixel number, the second value being determined by the second resolution.

3. The image processing device according to claim 1, wherein when generating the rectangular image data, the computer-readable instructions, when executed by the processor, causes the image processing device to further perform:
   deleting, from the intermediate image, at least one pixel positioned at an edge of the intermediate image in the first direction when the number of pixels aligned in the first direction of the intermediate image is larger than the third pixel number;
   deleting, from the intermediate image, at least one pixel positioned at an edge of the intermediate image in the second direction when the number of pixels aligned in the second direction of the intermediate image is larger than the fourth pixel number;
   adding at least one pixel to an edge of the intermediate image in the first direction when the number of pixels aligned in the first direction of the intermediate image is smaller than the third pixel number; and
   adding at least one pixel to an edge of the intermediate image in the second direction when the number of pixels aligned in the second direction of the intermediate image is smaller than the fourth pixel number.

4. The image processing device according to claim 3, wherein the intermediate image includes a prescribed rectangular region therein,
   wherein a reference point is set to at least one of a center portion in the first direction of the intermediate image and a center portion in the first direction of the prescribed rectangular region in order to be used at least one of a case where the deleting deletes, from the intermediate image, the at least one pixel positioned at the edge of the intermediate image in the first direction and a case where the adding adds the at least one pixel to the edge of the intermediate image in the first direction,
   wherein a reference point is set to at least one of a center portion in the second direction of the intermediate image and a center portion in the second direction of the prescribed rectangular region in order to be used at least one of a case where the deleting deletes, from the intermediate image, the at least one pixel positioned at the edge of the intermediate image in the second direction and a case where the adding adds the at least one pixel to the edge of the intermediate image in the second direction.

5. The image processing device according to claim 3, wherein the computer-readable instructions, when executed by the processor, causes the image processing device to further perform determining a background pixel value on a basis of a background pixel representing background of at least one of the first image, the second image, and the intermediate image,
   wherein a pixel value of the at least one pixel that is added to the intermediate image has the determined background pixel value.

6. The image processing device according to claim 1, wherein the memory further stores a plurality of sets of size data, each of the plurality of sets of size data indicating a size of a rectangular region,
   wherein the computer-readable instructions, when executed by the processor, causes the image processing device to further perform:
   specifying, from pixels in the intermediate image, a plurality of pixels whose pixel value is within a specific range;
   identifying a specific rectangular region encompassing the specified plurality of pixels, the specific rectangular region including a fifth pixel number and a sixth pixel number, the fifth pixel number indicating number of pixels aligned in the first direction of the specific rectangular region, the sixth pixel number indicating number of pixels aligned in the second direction of the specific rectangular region; and
   selecting a set of size data from the plurality of sets of size data by using at least one of the fifth pixel number and the sixth pixel number,
   wherein the rectangular image is generated on a basis of the selected set of size data.

7. The image processing device according to claim 6, wherein the computer-readable instructions, when executed by the processor, causes the image processing device to further perform calculating at least one of a first difference between the fifth pixel number and the first pixel number and a second difference between the sixth pixel number and the second pixel number,
   wherein the set of size data is selected on a basis of the calculated at least one of the first difference and the second difference.

8. The image processing device according to claim 6, wherein the set of size data is selected by using both the fifth pixel number and the sixth pixel number.

9. The image processing device according to claim 6, wherein when the selecting is incapable of selecting the set of size data, the generating generates the rectangular image data such that the rectangular image corresponds to an image within the specific rectangular region.

10. The image processing device according to claim 1, wherein the memory further stores a plurality of sets of size data, each of the plurality of sets of size data indicating a size of a rectangular region,
    wherein the computer-readable instructions, when executed by the processor, causes the image processing device to further perform selecting a set of size data from the plurality of sets of size data by using at least one of a seventh pixel number and an eighth pixel number, the seventh pixel number indicating number of pixels aligned in the first direction of the intermediate image, the eighth pixel number indicating number of pixels aligned in the second direction of the intermediate image,
    wherein the rectangular image is generated on a basis of the selected set of size data.

11. The image processing device according to claim 10, wherein the computer-readable instructions, when executed by the processor, causes the image processing device to further perform calculating at least one of a third difference between the seventh pixel number and the first pixel number and a fourth difference between the eighth pixel number and the second pixel number, wherein the set of size data is selected on a basis of the calculated at least one of the third difference and the fourth difference.

12. The image processing device according to claim 10, wherein the set of size data is selected from the plurality of sets of size data on a basis of one of the seventh pixel number and the eighth pixel number whichever is greater.

13. The image processing device according to claim 10, wherein the first image includes a first edge parallel to the first direction and the second image includes a second edge parallel to the first direction, wherein the intermediate image data is generated such that a partial region of the first image along the first edge is overlapped with a partial region of the second image along the second edge, wherein the set of size data is selected from the plurality of sets of size data by using number of pixels of the intermediate image in the second direction.

14. The image processing device according to claim 10, wherein the computer-readable instructions, when executed by the processor, causes the image processing device to further perform specifying an inscribed rectangular region of the intermediate image, wherein when the selecting is incapable of selecting the set of size data, the generating generates the rectangular image data such that the rectangular image corresponds to an image within the inscribed rectangular region.

15. The image processing device according to claim 1, wherein the computer-readable instructions, when executed by the processor, causes the image processing device to further perform outputting the rectangular image data to a printing unit.

16. The image processing device according to claim 1, wherein the first image data is generated by optically reading a first region of an original document and the second image data is generated by optically reading a second region of the original document.

17. An image processing device comprising:

a processor; and a memory storing computer-readable instructions therein, the computer-readable instructions, when executed by the processor, causing the image processing device to perform:

acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region;

acquiring first image data representing a first image and second image data representing a second image;

generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image, the intermediate image having a first resolution with respect to the first direction and a second resolution with respect to the second direction;

calculating a third pixel number by multiplying a first value by the first pixel number, the first value being determined by the first resolution;

calculating a fourth pixel number by multiplying a second value by the second pixel number, the second value being determined by the second resolution; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with the third pixel number and number of pixels aligned in the second direction of the rectangular image is brought into coincidence with the fourth pixel number.

18. The image processing device according to claim 17, wherein the memory further stores a plurality of sets of size data, each of the plurality of sets of size data indicating a size of a rectangular region, wherein the computer-readable instructions, when executed by the processor, causes the image processing device to further perform:

specifying, from pixels in the intermediate image, a plurality of pixels whose pixel value is within a specific range;

identifying a specific rectangular region encompassing the specified plurality of pixels, the specific rectangular region including a fifth pixel number and a sixth pixel number, the fifth pixel number indicating number of pixels aligned in the first direction of the specific rectangular region, the sixth pixel number indicating number of pixels aligned in the second direction of the specific rectangular region; and selecting a set of size data from the plurality of sets of size data by using at least one of the fifth pixel number and the sixth pixel number, wherein the rectangular image is generated on a basis of the selected set of size data.

19. The image processing device according to claim 17, wherein the memory further stores a plurality of sets of size data, each of the plurality of sets of size data indicating a size of a rectangular region, wherein the computer-readable instructions, when executed by the processor, causes the image processing device to further perform selecting a set of size data from the plurality of sets of size data by using at least one of a seventh pixel number and an eighth pixel number, the seventh pixel number indicating number of pixels aligned in the first direction of the intermediate image, the eighth pixel number indicating number of pixels aligned in the second direction of the intermediate image, wherein the rectangular image is generated on a basis of the selected set of size data.

20. A non-transitory computer readable storage medium storing a set of program instructions installed on and executed by a computer, the program instructions comprising:

acquiring size data indicating a size of a rectangular region, the size data including a first pixel number and a second pixel number, the first pixel number indicating number of pixels aligned in a first direction of the rectangular region, the second pixel number indicating number of pixels aligned in a second direction orthogonal to the first direction of the rectangular region;

acquiring first image data representing a first image and second image data representing a second image;

generating intermediate image data representing an intermediate image in which the first image is combined with the second image in such a manner that at least a part of the first image and at least a part of the second image are arranged in side-by-side, number of pixels of the intermediate image being larger than each of the number of pixels of the first image and the number of pixels of the second image; and generating rectangular image data representing a rectangular image by executing at least one of addition of at least one pixel to the intermediate image and deletion of at least one pixel from the intermediate image such that number of pixels aligned in the first direction of the rectangular image is brought into coincidence with a third pixel number and number of pixels aligned in the second direction of the rectangular image is brought into coincidence with a fourth pixel number, the third pixel number being obtained by using the first pixel number, the fourth pixel number being obtained by using the second pixel number, a ratio of the third pixel number to the fourth pixel number being equal to a ratio of the first pixel number to the second pixel number.

* * * * *